United States Patent [19]
Stolzer et al.

[11] Patent Number: 5,816,774
[45] Date of Patent: Oct. 6, 1998

[54] SETUP APPARATUS FOR STORING AND TRANSPORTING LONG WORKPIECES

[75] Inventors: Armin Stolzer, Baden-Baden; Oskar Schwarz, Stuttgart, both of Germany

[73] Assignees: Keuro Besitz GmbH & Co.; EDV-Dienstleistungs KG, both of Achern, Germany

[21] Appl. No.: 739,120

[22] Filed: Oct. 25, 1996

[30] Foreign Application Priority Data

Oct. 28, 1995 [DE] Germany ................ 295 17 134 U

[51] Int. Cl.[6] .................................................. B66C 1/18
[52] U.S. Cl. ................. 414/792.8; 414/626; 414/746.8; 294/97
[58] Field of Search ................. 414/792.8, 793.8, 414/794.2, 618, 626, 745.7, 746.8; 294/97

[56] References Cited

U.S. PATENT DOCUMENTS

| | | | |
|---|---|---|---|
| 4,045,071 | 8/1977 | Dunstan | 414/626 |
| 4,252,486 | 2/1981 | Soligno | 414/276 |
| 4,648,771 | 3/1987 | Yoshioka | 414/792.8 |
| 4,749,327 | 6/1988 | Roda | 414/792.8 |
| 5,088,783 | 2/1992 | Squires | 414/626 |
| 5,147,176 | 9/1992 | Stolzer et al. | 414/786 |
| 5,156,514 | 10/1992 | Zäh | 414/278 |
| 5,281,070 | 1/1994 | Stolzer | 414/281 |
| 5,324,157 | 6/1994 | Stolzer | 414/281 |
| 5,395,200 | 3/1995 | Meier | 414/281 |
| 5,536,129 | 7/1996 | Stolzer | 414/278 |

FOREIGN PATENT DOCUMENTS

| | | | |
|---|---|---|---|
| 843297 | 6/1970 | Canada | 414/618 |
| 1356384 | 6/1964 | France . | |
| 1431799 | 6/1966 | France . | |
| 2675792 | 10/1992 | France . | |
| 27 38 332 | 10/1979 | Germany . | |
| 3012826 | 10/1981 | Germany . | |
| 892665 | 3/1962 | United Kingdom . | |

*Primary Examiner*—David A. Bucci
*Assistant Examiner*—Douglas Hess
*Attorney, Agent, or Firm*—Frishauf, Holtz, Goodman, Langer & Chick, P.C.

[57] ABSTRACT

A setup for storing and transporting long workpieces includes at least two yokes in which the workpieces are received on a bottom part and between two vertical side parts joined thereto. The yokes are stackable on one another and the side parts have an engagement device for engagement of load receivers of a lifting system. The setup is provided such that the engagement device of the load receivers (69, 70, 75–78, 83, 84, 91, 92, 105, 106, 120, 121, 128, 129) are formed by at least one protrusion (58–61, 87, 88, 95, 96, 101) on the outside of each side part (32, 33). The lifting system (6), associated with each side part (32, 33), has two load receivers (69, 70, 75–78, 83, 84, 91, 92, 105, 106, 120, 121, 128, 129) and at least one load arm (26, 27, 73, 74, 82, 89, 90, 102, 118, 119, 126, 127) extending substantially vertically downward and supporting the load receivers (69, 70, 75–78, 83, 84, 91, 92, 105, 106, 120, 121, 128, 129). The load receivers (69, 70, 75–78, 83, 84, 91, 92, 105, 106, 120, 121, 128, 129) are adjustable between a position horizontally beside the protrusions (58–61, 87, 88, 95, 96, 101) and a position below the protrusions (58–61, 87, 88, 95, 96, 101).

34 Claims, 18 Drawing Sheets

FIG. 4
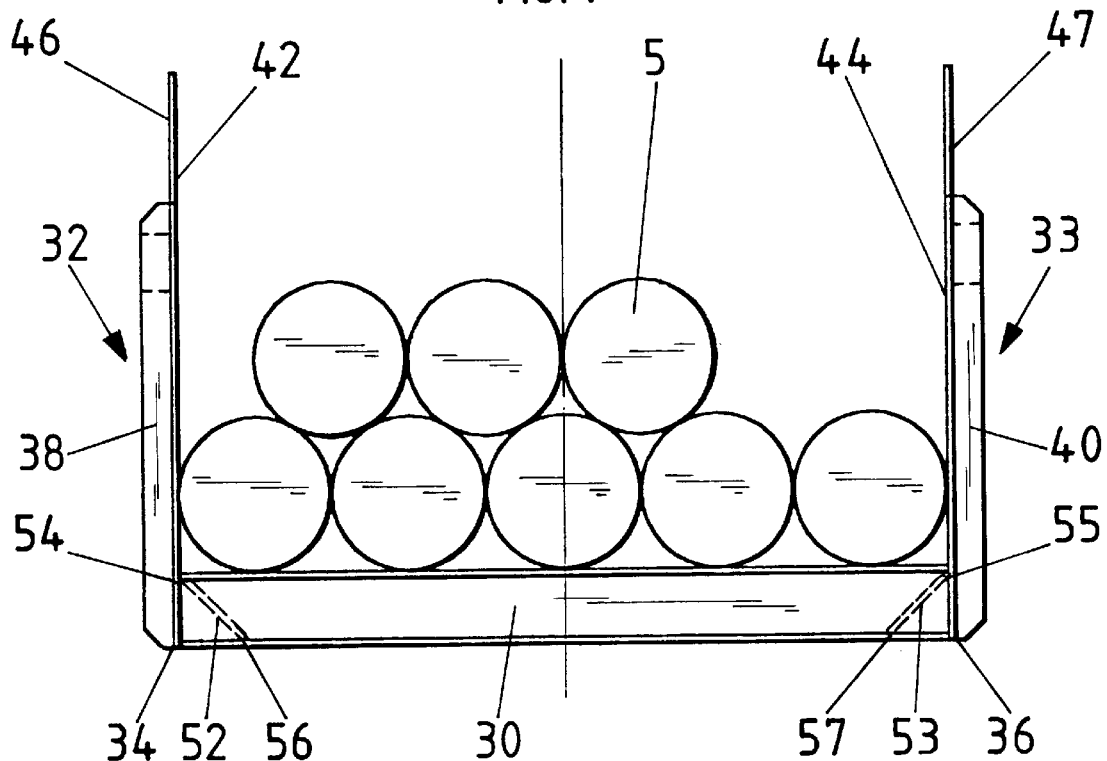
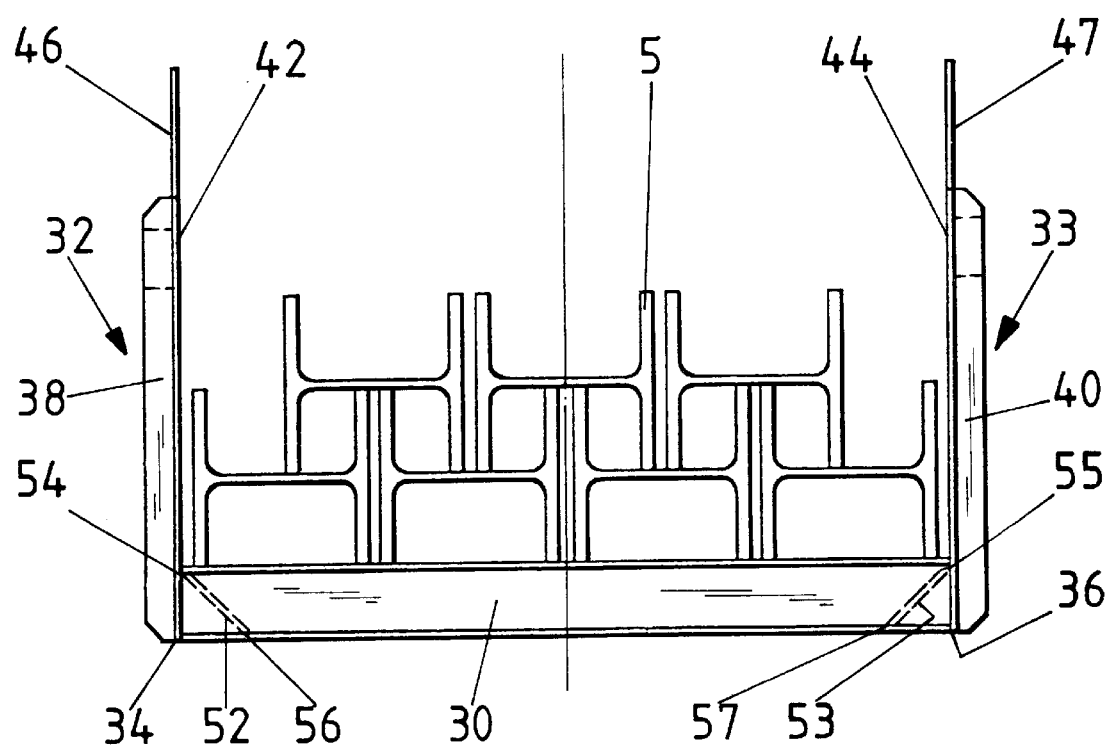

SETUP APPARATUS FOR STORING AND TRANSPORTING LONG WORKPIECES

CROSS REFERENCE TO RELATED PATENTS

Reference is made to related patents, assigned to the assignee of this application, the disclosures of which are hereby incorporated by reference:

U.S. Pat. No. 5,147,176 to Stolzer et al, issued Sep. 15, 1992;

U.S. Pat. No. 5,156,514 to Zäh issued, Oct. 20, 1992;

U.S. Pat. No. 5,281,070 to Stolzer issued, Jan. 25, 1994;

U.S. Pat. No. 5,324,157 to Stolzer issued, Jun. 28, 1994;

U.S. Pat. No. 5,395,200 to Meier issued, Mar. 7, 1995; and

U.S. Pat. No. 5,536,129 to Stolzer issued, Jul. 16, 1996.

BACKGROUND OF THE INVENTION

1. Field of the Invention

The present invention relates to apparatus for storing and transporting long workpieces such as rods, pipes, metal sheets, or the like, having at least two stackable yokes which are open above the workpieces. More particularly, the invention relates to apparatus in which the workpieces are received on a substantially horizontal bottom part, extending along the longitudinal direction of the workpieces, and between two substantially vertical side parts connected to the bottom part which include a device for engagement of lifting system load receivers for lifting and setting down the yokes.

2. Description of the Prior Art

German Patent No. 27 38 332 discloses apparatus for storage and transport of workpieces wherein side parts of the yokes have hooklike suspension plates on their upper ends for lifting the yokes. The yokes are lifted by means of a crossbar mounted on a crane. The crossbar is suspended from the hooks by laterally protruding arms. The hooklike suspension plates protrude into a hollow region of the yoke so that they are not a hindrance when a plurality of yokes are stacked on one another.

The known setup has the disadvantage that the manufacturing and production of the yokes is complicated by the need to provide complicated burn templates (e.g. blanks cut out by a laser or the like). A further drawback resides in that the yokes are substantially unstable while suspended from the crossbar during transport. Moreover, the known setup is unsuitable for automatic operation, since the laterally protruding arms of the crossbar each have to be manually threaded onto the hooks of the suspension plates or threaded by complicated driving motions of the lifting system that can only be controlled by hand. Finally, with the known apparatus, it is difficult and time-consuming to remove workpieces of a certain type (i.e., from a specific stack) from storage unless they are the uppermost package (stack) of workpieces. That is, if the workpieces to be removed from storage are contained in a stack other than the top stack, the workpiece packages (yoke) located above the desired workpiece stack must first be lifted off individually and moved elsewhere, until the workpieces to be removed are in the uppermost stack and can be accessed by means of the lifting system.

OBJECTS AND SUMMARY OF THE INVENTION

It is therefore the object of the present invention to provide setup apparatus having yokes that are simple to receive in a positionally stable manner such that the yokes can be automated manipulated by a lifting system.

It is a further object of the present invention to provide setup apparatus which enables more than one stacked yoke to be concurrently transported during operation of the lifting system.

It is a further object of the present invention to provide setup apparatus for storing and transporting long workpieces which overcomes inherent disadvantages of known setup apparatus.

Briefly, the setup apparatus in accordance with the present invention comprises a plurality of yokes which are open above the workpieces stored therein. The workpieces are received on a substantially horizontal bottom part (U-shaped profile) which extends transversely along a longitudinal direction of the workpieces in between two substantially vertical side parts (profile bars). The yokes are stackable on one another. The side parts include means for engagement of load receivers (protrusions) of a lifting system for lifting and setting down the yokes. The means for engagement of the load receivers include protrusions formed on an exterior surface of each side part. The lifting system includes at least one load arm extending substantially vertically downward from a load carrying beam. The load arm includes load receivers for engaging the protrusions of the yokes. The load receivers are adjustable between a horizontal position beside the protrusions and a position below the protrusions so as to operatively engage the protrusions.

These provisions of the invention have the effect that the vertical load arms can be moved laterally downward past the protrusions, close to side parts of the yokes, until the load receivers are located at a height just below the protrusions. The load receivers can then be horizontally moved by suitable adjusting means into their position just beneath the protrusions. Thereafter, the vertical load arm (including the load receivers) can be raised with the aid of the lifting system to engage the protrusions. Unlike the prior art, complicated manipulation for threading the load receivers to the protrusions is unnecessary since the position of the load receivers associated with the protrusions is always correctly predetermined by the position of the vertical load arms. Since in a preferred embodiment, each side part is assigned two load receivers for manipulating the yoke, the yokes advantageously rest on the load arms in a manner which is substantially secure and will not tilt. Finally, the present invention makes it possible to arrange the stacked yokes, and hence the stacks of workpiece packages, closely side by side, even though the load arms and load receivers are being moved closely past the yokes. The load receivers may be adjustable along the longitudinal direction of the horizontal bottom part if the protrusions are located on an inside surface of the vertical side part of the yoke.

It is also within the scope of the present invention if, as the load arms are moved downward, the load receivers engage a side of the protrusions in order to counter to a spring force to latch into place (operatively engage) the protrusions by means of the spring force. To reverse this connection, the load receivers can then be moved away underneath the protrusions by the adjusting means, counter to the spring force.

In accordance with the present invention, it is sufficient for each side part to have only one protrusion. Then care need merely be taken so that the load receivers associated with the protrusion are moved toward the protrusion to a position underneath the protrusion. In this case, the protrusion has a horizontal component parallel to the longitudinal direction of the workpieces (between the protrusion and the vertical side part) such that there is room for manipulation of the load arm to enable engagement with the load receiver from either side.

However, it is considered expedient for each side part to have two protrusions proximally located in a common horizontal plane (i.e. to be located at the same height). The protrusions can be centrally located on an exterior surface of the side parts. It is also foreseen that the protrusions may be positioned along the vertical outer edges of an exterior surface of the side parts.

Depending on the embodiment of the invention, each side part may have assigned thereto only one load arm, which includes two adjustable load receivers on the lower end of the load arm. It is also foreseen that each side part may have assigned thereto two load arms, side by side, each of which is equipped with a load receiver on an unattached end.

Regarding the construction of the yokes, it is advantageous that the side parts are each formed by at least two substantially vertical metal profile bars. The bottom part preferably includes at least two profile bars extending substantially horizontally, transverse to the longitudinal direction of the workpieces. The ends of each of the metal profile bars are joined to the lower ends of a pair of vertical profile bars substantially opposite one another transverse to the longitudinal direction of the workpieces.

In accordance with the invention, the vertical profile bars have an L-shaped cross section (first and second legs) and may be arranged such that a first leg points away from the workpieces, and a second leg which is perpendicular to the first leg, points in a direction parallel to the longitudinal direction of the workpieces. The horizontal profile bars, in contrast, have a U-shaped or tubular cross section. The U-shaped profile bars may be arranged such that the U-shaped openings point away from the storage location of the workpieces. The U-shaped openings of first and second horizontal profile bars point in directions that are parallel to and substantially face in opposite directions.

It may also be provided that the vertical profile bars are coupled in the region of the upper half of their longitudinal extent by an interposed metal plate placed in a substantially vertical plane. The vertical surfaces of the metal plates are arranged so as to be in substantially the same plane as the second leg of corresponding vertical profile bars. It is sufficient that the thickness of the metal plates is less than that of the cross section of the vertical profile bars.

A metal sheet is located between the ends of the horizontal profile bars and within the vertical cross-sectional region occupied by the workpieces. The upper edge and lower edge of the metal sheet are located within the height range defined by a vertical extent of the cross section of the profile bars.

The above-described characteristics of the invention provide yokes that are overall very stable and yet very simple to manufacture. This is due to the fact that the yokes are entirely composed of elements that can be made from commercially available materials.

The metal plates are embodied such that they have a portion (upper horizontal edge and upper angled edge) that extends above beyond upper ends of the vertical profile bars. The upper angled edges of the metal plates include chamfers. The upper angled edges extend toward one another and toward the upper horizontal edge of the metal plate. As a result of this configuration, yokes which are stacked on one another can be automatically centered. This centering occurs for both the directions which are longitudinal and traverse with respect to the workpieces.

In the embodiment of the yokes thus described, it is now possible to provide only one protrusion for a side part which is located approximately horizontally and centrally on a surface of the metal plate opposite the workpieces.

If two protrusions are provided for each side part, then the protrusions may be located on distal edges of the side part. Preferably the protrusions are coupled to both the vertical profile bar and the metal plate. It is also foreseen that the protrusions may be coupled to a portion (second leg) of the vertical profile bars and not coupled to the metal plate.

It is preferred that the protrusions be arranged in the upper half region of the vertical profile bars. Moreover, it is advantageous that the protrusions have a substantially hollow cross section that is open in the vertical direction. In view of this arrangement, the load receivers may be provided with an upward-protruding pawl, which can be utilized for positive engagement with the protrusions. This then substantially assures engagement of the pawl and protrusion even under adverse circumstances, such as a power failure.

Another possibility is attained in that if the side parts are equipped with two protrusions, the horizontal profile bars extend to the vertical outside of the side parts and are formed as U-shaped profile legs with profile openings pointing away from one another such that the upper legs of the profile bars form the protrusions. As a result, the protrusions result from the embodiment of the yokes themselves, making it unnecessary to manufacture and mount separate components to form the protrusions.

The lifting system may be provided such that it has a vertically movable lifting beam extending substantially over the longitudinal region where the workpieces are placed. The system also includes load arms which are secured to the side and extend downward from the lifting beam in a vertical plane corresponding to the plane occupied by associated protrusions and the side parts of the yokes.

If one load arm is provided for each side part, then as already noted, these load arms, on each of their lower ends, may have two receivers that are adjusted in the horizontal direction between an extended and a retracted position.

If for each side part two load arms are positioned in a common plane parallel to the corresponding side part, the load arms may be supported on the lifting beam, pivotable about the horizontal shaft which extends transversely to the longitudinal direction of the workpieces. The load arms are preferably coupled to means for pivot actuation, and in such case, the load arms have on their lower ends, a load receiver protruding horizontally in the direction of the associated protrusion.

The situation is different for load receivers that can be adjusted crosswise to the longitudinal direction of the workpieces. They need corresponding load arms, each supported on the lifting beam pivotable about a shaft which extends horizontally, parallel to the longitudinal direction of the workpieces.

In a further embodiment of the invention, the load arms have a free length that spans the height of at least two yokes stacked on one another. Alternatively, the load arms have a plurality of load receivers, one above the other, optionally provided with pawls, for engagement with the protrusions of yokes stacked on one another. In this way, depending on how many load receivers are disposed (stacked) one above the other, a plurality of yokes and thus a plurality of workpiece packages seated on one another can be lifted and moved elsewhere. Consequently, material located inside a stack is accessible sooner so that it can be brought to a desired location.

It is preferred that the mutual spacing of load receivers on a load arm, one above the other, is at least slightly greater than the mutual spacing of the protrusions of stacked yokes. By spacing the load receivers in this way, each yoke is individually raised by corresponding load receivers. Therefore, each load receiver/protrusion combination needs to carry only the weight of one yoke plus the associated weight component of the workpieces stored therein. The load receivers and protrusions of the individual yoke are accordingly not burdened by the weight of a plurality of yokes stacked on one another.

The lifting system may embodied as a crane installed above the yokes and below the roof of a hangar-like storage space. By means of the crane, the load-carrying beam together with the load arms that it carries, can be raised, lowered and moved horizontally to engage the protrusions of a respective yoke. It has been found to be especially advantageous that the lifting system is a full-gantry crane construction, with vertical supports outside the ends of the workpieces being movable transversely to the longitudinal extent of the workpieces. It has also be found beneficial for the lifting system to have at least one longitudinal girder coupling the upper ends of the vertical supports wherein the girder extends in a parallel manner to the workpieces, and that the load-carrying beam is vertically movable about its ends and guided on the vertical supports. The vertical supports of the lifting system may then be movable along the ground transversely to the longitudinal extent of the workpieces. In particular, since such a lifting system is supported on the floor, it is more easily retrofitted into an existing hangar-like space than a ceiling-mounted crane system.

Finally, the spacing of the load arms, transverse to the longitudinal direction of the workpieces, may be made adjustable with a view to different yoke widths. As a result, a plurality of yoke sizes can be used in a relatively large workpiece storage system, although naturally for a given stack of yokes only one yoke size is preferred.

The setup apparatus according to the invention makes it possible to execute the motions of storage and removal from storage automatically under the control of a computer, by way of which the workpieces received by the yokes can also be handled in a manner along the lines of random storage.

A preferred form of the setup apparatus, as well as other embodiments, objects, features and advantages of the invention, will be apparent from the following detailed description of illustrative embodiments thereof, which is to be read in connection with the accompanying drawings.

BRIEF DESCRIPTIONS OF THE DRAWINGS

FIG. 4 is an elevation view of two yokes that can be stacked on one another, in a state in which they have been separated;

DETAILED DESCRIPTION OF THE PREFERRED EMBODIMENT

Figure 1:
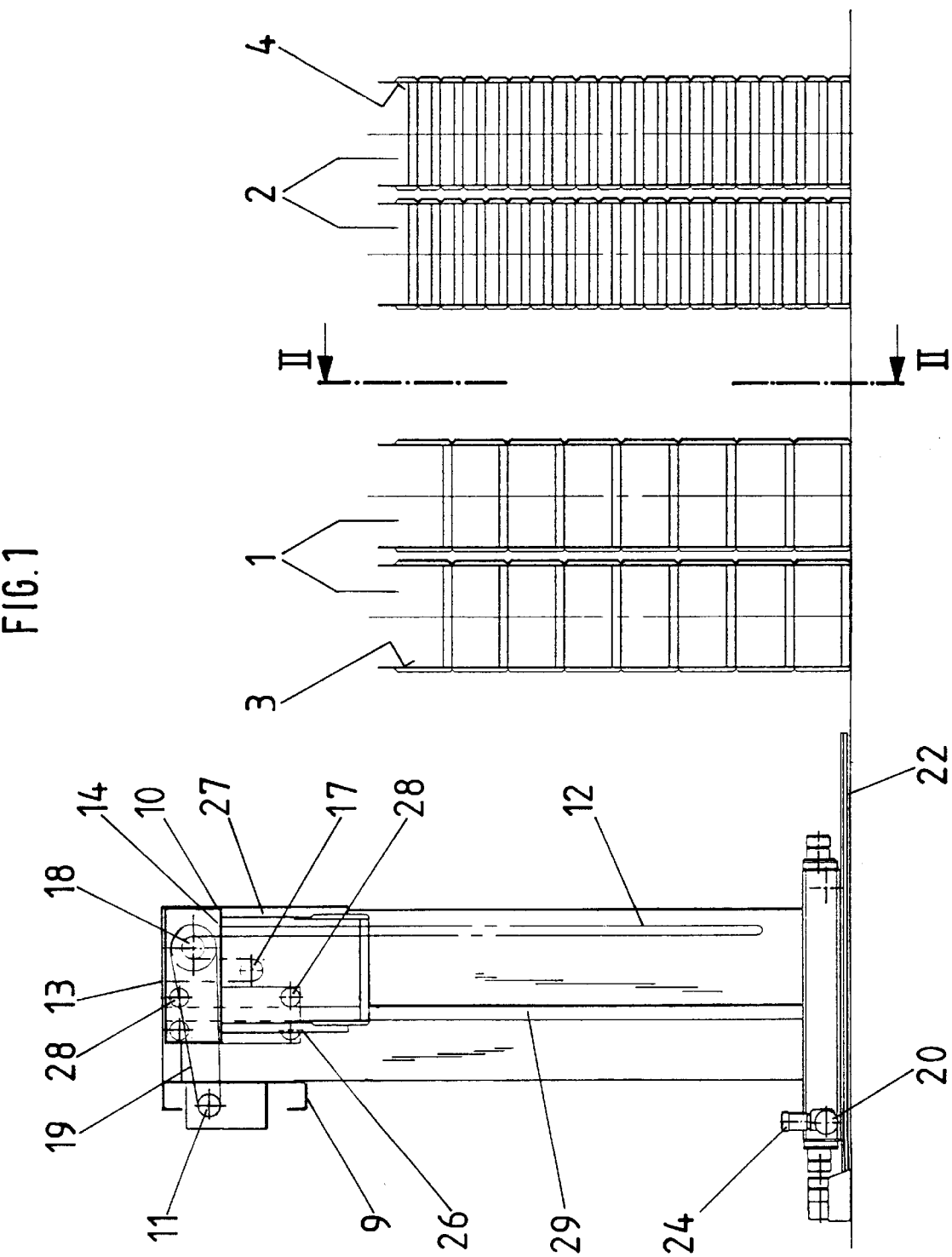
FIG. 1 is a simplified side view of a setup for storing and transporting long workpieces, taken along the section line I—I of FIG. 2.
Figure 2:
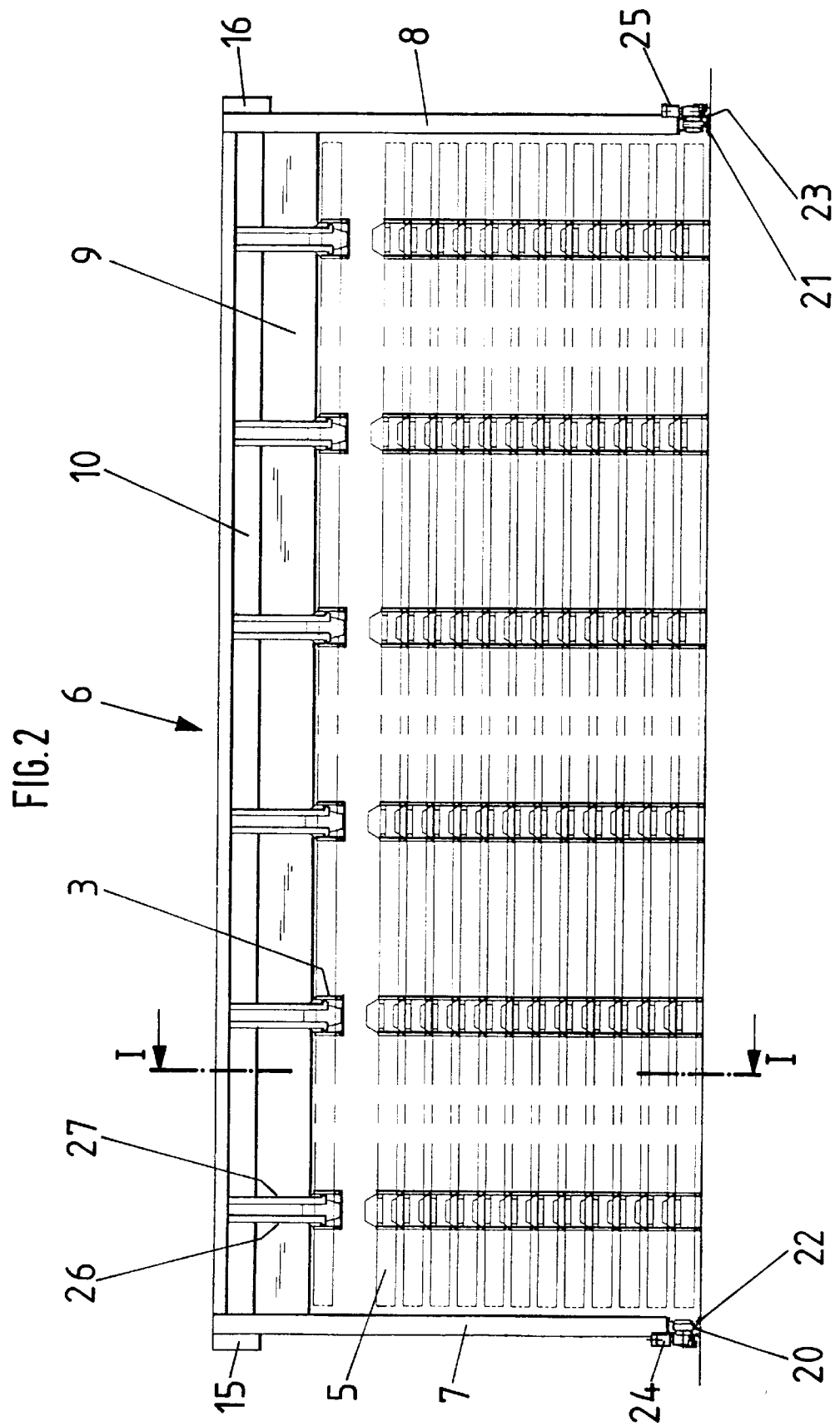
FIG. 2 is a sectional view taken along the line II—II of FIG. 1.

Referring now to FIGS. 1 and 2, stacks 1, 2 of yokes 3, 4, placed on one another are disposed side by side to form a storage system for long workpieces 5. As shown in FIG. 2, a plurality of yokes 3 (twelve in the embodiment shown in FIG. 2) in vertical succession as shown in FIG. 1, are associated with one type of long workpiece 5, such that each long workpiece 5 is securely held over its longitudinal extent so that the long workpieces will not sag.

A lifting system in the form of a full-gantry crane 6 is movable above a block-like region occupied by the stacks 1, 2, of which only a few are shown in the figures as examples. The crane 6 has vertical supports 7, 8, movable on a floor substantially crosswise to a longitudinal extent of the workpieces 5 stored in the yokes 3, 4. The upper ends of the supports 7, 8 are coupled to one another by at least one longitudinal girder 9 extending in substantially parallel relation to the workpieces 5.

Adjacent the longitudinal girder 9 is a load-carrying beam 10. The load-carrying beam 10 is vertically movable and is guided along its axial ends via rollers 28 on rails 29 (FIG. 1) of vertical supports 7, 8. The vertical motion is accomplished by lifting means powered by a motor-driven shaft 11. The lifting means include chains 12, which are located proximate the end of the load-carrying beam 10. The lifting means are preferably coupled to mounting parts 15, 16 by one end at location 13 in the upper region of the vertical supports 7, 8 and by the opposite end at location 14 in the lower region of the vertical supports 7, 8. In the preferred embodiment in the manner shown in FIG. 1, the chains 12 are each guided on the ends of the load-carrying beam 10 about a deflection wheel 17 and, in the case of the mounting parts 15, 16, about a driven wheel 18. The driven wheel 18 rotates shaft 11 via a pulley means 19. The vertical motion of the load-carrying beam 10 that can be executed in this way is known per se and will not be described herein in further detail.

With respect to the movability along the floor of the full-gantry crane 6, the vertical supports 7, 8 have rollers 20, 21 which engage rails 22, 23 on their bottom ends. The rollers 20, 21 are driven along the rails by motors 24, 25.

As can be seen particularly from FIG. 2, the load-carrying beam 10, is equipped with load arms 26, 27 on both sides of the beam. By way of the load arms 26, 27, the yokes 3, 4 are grasped on their side parts 32, 33 (FIG. 4) and can thus be moved both vertically and horizontally by driving motions of both the load-carrying beam 10 and the full-gantry crane 6.

Figure 3:
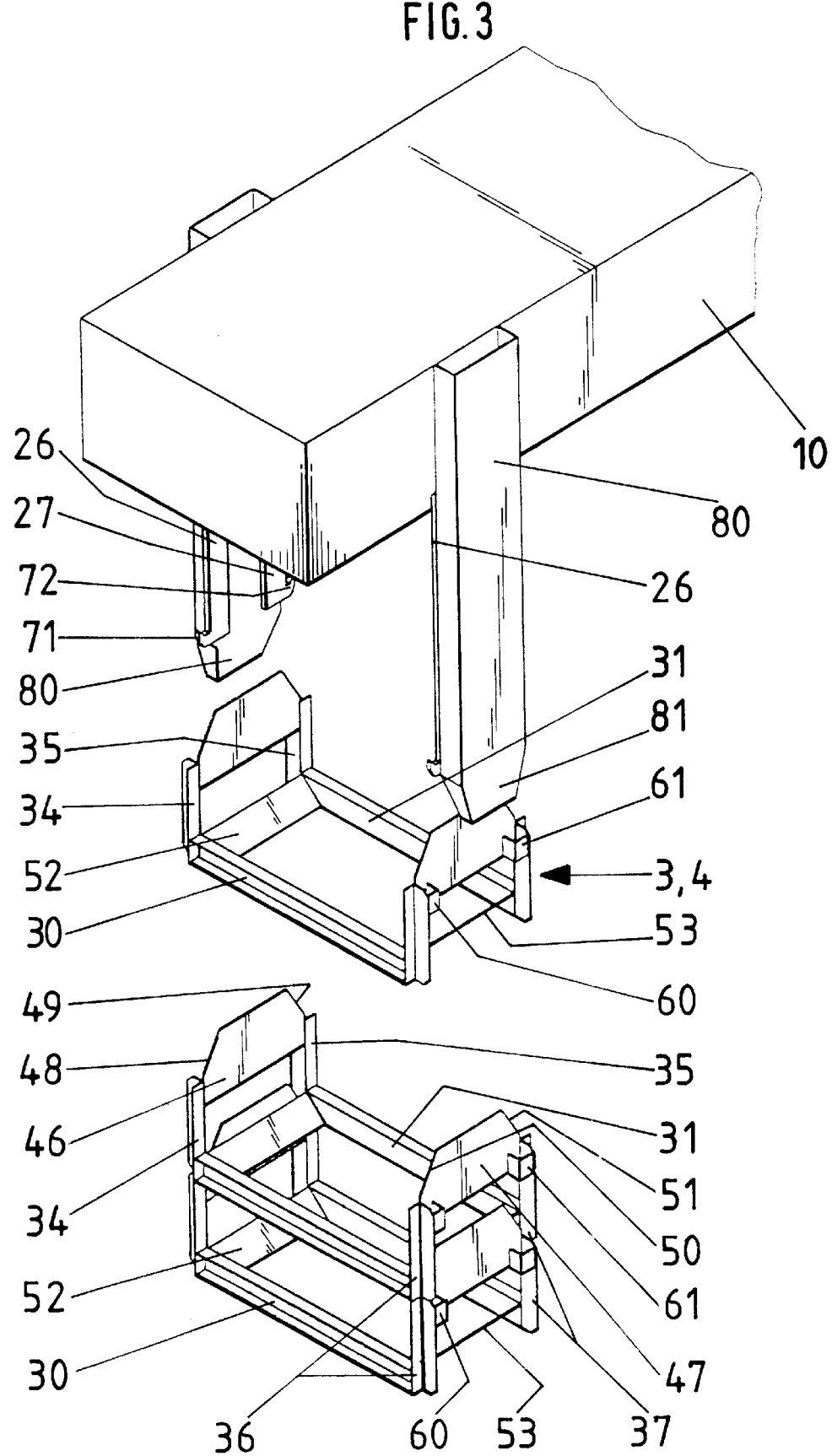
FIG. 3 is a detailed view of FIGS. 1 and 2 in an enlarged perspective view.

FIG. 3, which is a simplified perspective view on a larger scale of FIGS. 1 and 2, shows the left-hand end of the load-carrying beam 10 of FIG. 2 with yoke 3, 4. Beneath yoke 3, 4 are two additional yokes, stacked one on top of the other, the details of which will become apparent from the ensuing description.

Referring now to FIGS. 4, 5, 6 and 7, the structure of the yokes 3, 4 of FIGS. 1–3 will be explained. The structure of yokes 3, 4 are generally in principle always the same. The yokes 3 and 4 shown in FIG. 4 are distinguished from one another only by their height and thus their capacity for holding long workpieces 5.

As to their bottom part, the yokes have two spaced-apart U-shaped profiles 30, 31, which are arranged with their respective U-shaped openings pointing away from one another and the workpieces stored in the yoke.

Figure 5:
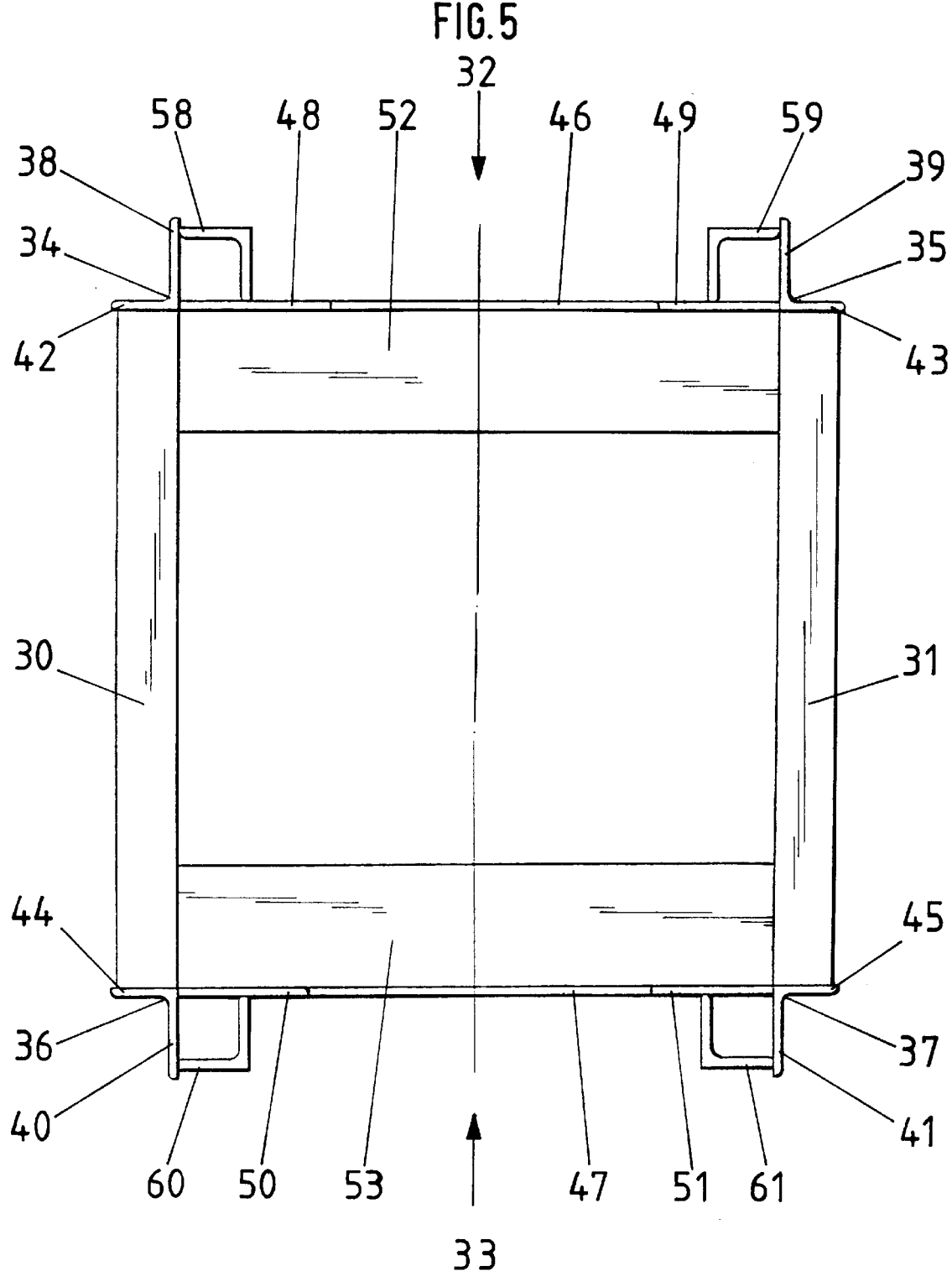
FIG. 5 is a top plan view of one yoke of FIG. 4.
Figure 6:
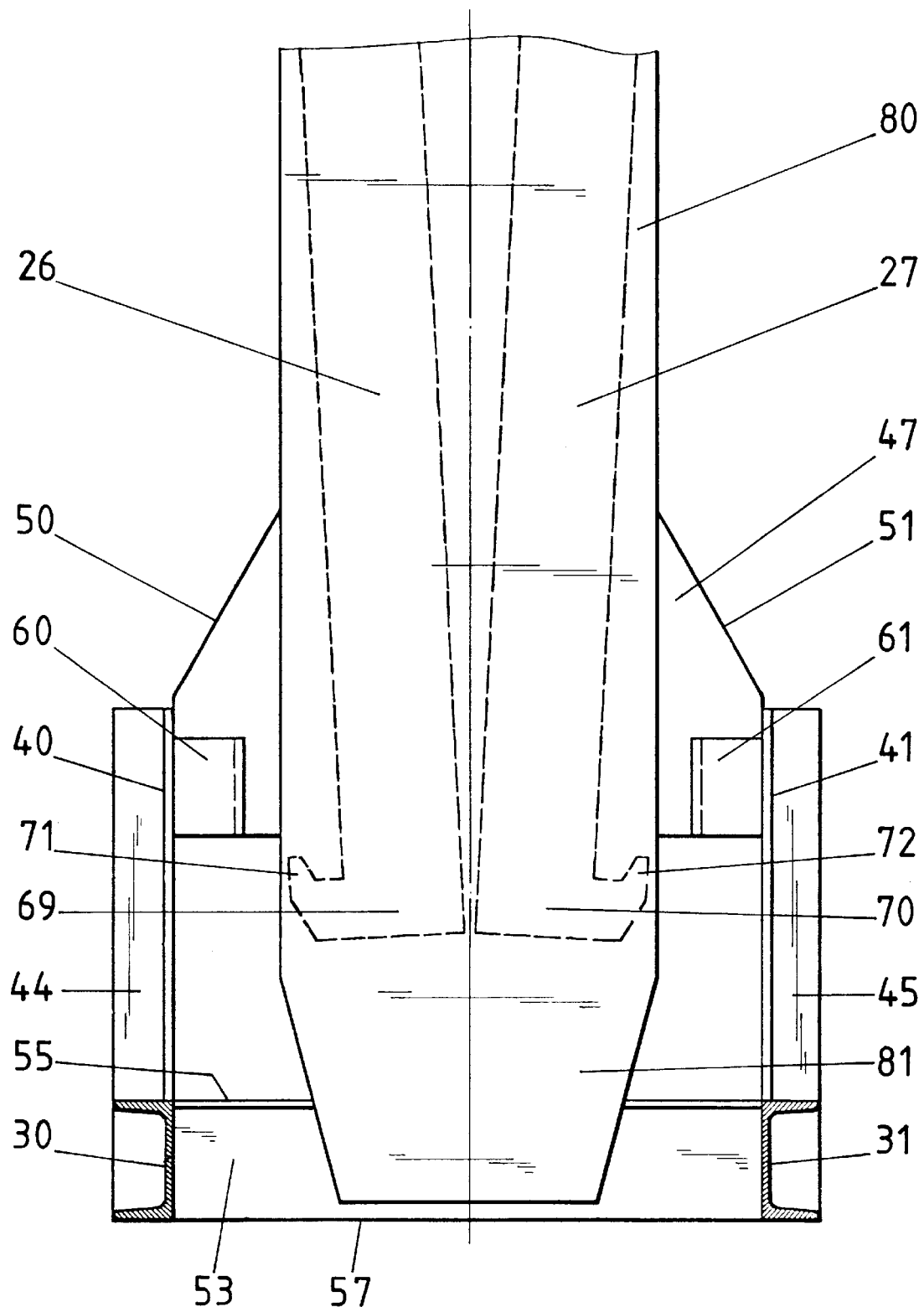
FIG. 6 is a side view of one yoke of FIG. 4 together with an associated load arm and load receiving means in their position for free vertical motion.

Referring now to FIG. 5, joined to the ends of the profiles 30, 31 (to form a portion of the side parts 32, 33 of the yokes) are vertical L-shape profile bars 34, 35, 36, 37, respectively. The L-shape profile bars have legs numbered 38, 39, 40, 41 which point away from the workpieces, while the legs numbered 42, 43, 44, 45 point away from legs 38, 39, 40, 41. The horizontal and vertical profile bars are preferably made of metal.

The vertical L-shape profile bars 34, 35, 36, 37, associated with respective side parts 32, 33, are coupled in an upper half region of their longitudinal extent by interposed metal plates 46, 47. The metal plates 46, 47 are oriented in an essentially vertical plane. The metal plates 46, 47 are preferably oriented such that a first surface faces toward the workpieces 5 (as shown in FIG. 5). The metal plates are preferably located in substantially the same plane as legs 42, 43 and 44, 45 of the vertical L-shape profile bars 34, 35 and 36, 37 respectively. The horizontal thickness of the metal plates 46, 47 is also preferably substantially less than that of the cross section of the vertical L-shape profile bars 34, 35, 36, 37.

The metal plates 46, 47 preferably have a height (an upper horizontal edge and an upper angled edge) that extends beyond the upper ends of the associated profile bars 34, 35, 36, 37. The side edges of each of the upper angled edge of the metal plates 46, 47 have chamfers 48, 49, 50, 51.

As shown in FIG. 3, in a bottom region of the yoke between respective ends of the horizontal profile bars 30, 31, metal sheets 52, 53 are inserted parallel to the longitudinal direction of the workpieces 5 (FIG. 4) within a vertical cross-sectional region occupied by the workpieces 5. The metal sheets 52, 53 are arranged such that their upper edges 54, 55 and lower edges 56, 57 are all located within the vertical region defined by the vertical extent (height) of the cross section of the profile bars 30, 31. Moreover as shown in FIG. 4, the metal sheets 52, 53 are obliquely positioned such that their upper edges 54, 55 are spaced apart by a greater distance than the distance which separates the lower edges 56, 57.

Referring now to FIG. 5, on the portion of the side part which is distal with respect to the workpieces, the side parts 32, 33 each have two protrusions 58, 59 and 60, 61, which are arranged along a side of the metal plates 46, 47 which is distal with respect to the location of the workpieces 5. Each of the two protrusions on each side part are oriented so as to extend between respective vertical L-shape profile bars 34, 35, 36, 37 and the metal plates 46, 47. The protrusions 58, 59, 60, 61 are located in the region of the upper half of the longitudinal extent of the profile bars 34, 35, 36, 37 and, for reasons to be described hereinafter, are embodied as hollow cross sections open at both a top and bottom.

In accordance with the present invention, the yokes 3 and 4 can be lifted, moved and transported via respective protrusions 58, 59, 60, 61. To that end, the vertical load arms 26, 27 are preferably used, which have already been described in conjunction with FIGS. 1 and 2. The vertical load arms 26, 27 are provided for each side part of the yokes belonging to one type of workpiece. The load arms are also shown on a larger scale in FIGS. 6 and 7. As can be seen from the detail view in FIG. 8, the load arms 26, 27 are each pivotally supported in an upper region of the lifting beam 10 about horizontal shaft 62, 63 which extends transverse to the longitudinal direction of the workpieces 5. The load arms are coupled together with means for actuating pivoting. In one embodiment as shown in FIG. 8, the means for actuating pivoting includes an adjusting device 64 operatively coupled to load arm 26 and load arm 27 and secured (not shown in FIG. 8) to the lifting beam 10. In a preferred embodiment, the adjusting device 64 includes piston rods 65, 66 that can be horizontally adjusted and that are rotatably pivotally connected to the load arms 26, 27 at connection points 67, 68.

Referring again to FIGS. 6 and 7, the load arms 26 and 27 are capable of being pivoted, with the aid of adjusting device 64, between the position shown in FIG. 6 (which is inoperative with respect to contacting the protrusions) and the position shown in FIG. 7 (which is suitable for engaging the protrusions and lifting the yokes). Thus the load arms 26, 27, in the position shown in FIG. 6, can be moved through the space between the protrusions 60, 61 so as to engage a desired yoke. Once the load arms are placed proximate a desired yoke, the load arms 26, 27 are pivoted into the position shown in FIG. 7 such that the load receivers 69, 70 of respective load arms 26, 27 come to be located substantially directly below the protrusions 60, 61. As a result, the yoke can be lifted when the load receivers 69, 70 engage respective protrusions by suitable actuation (a raising up) of the lifting beam 10. To secure the engagement of the load receivers and the protrusions, each load receiver 69, 70 includes on its free end an upward-protruding pawl 71, 72, which when the load arms 26, 27 are raised, substantially fixedly engage the hollow center portion of the protrusions 60, 61.

Figure 7:
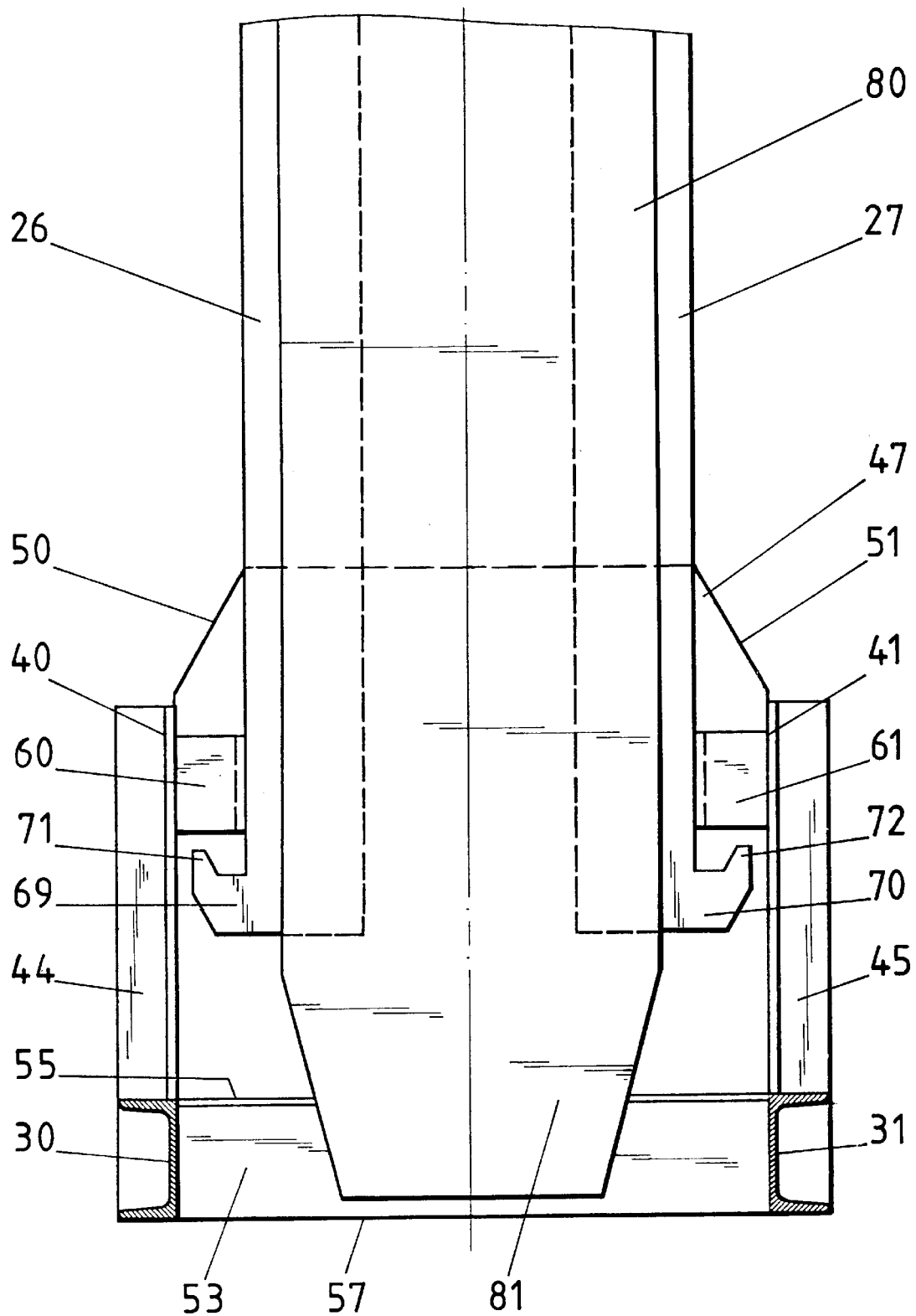
FIG. 7 is a view corresponding to FIG. 6, showing the load receiving means in a position prior to engagement of a yoke.
Figure 8:
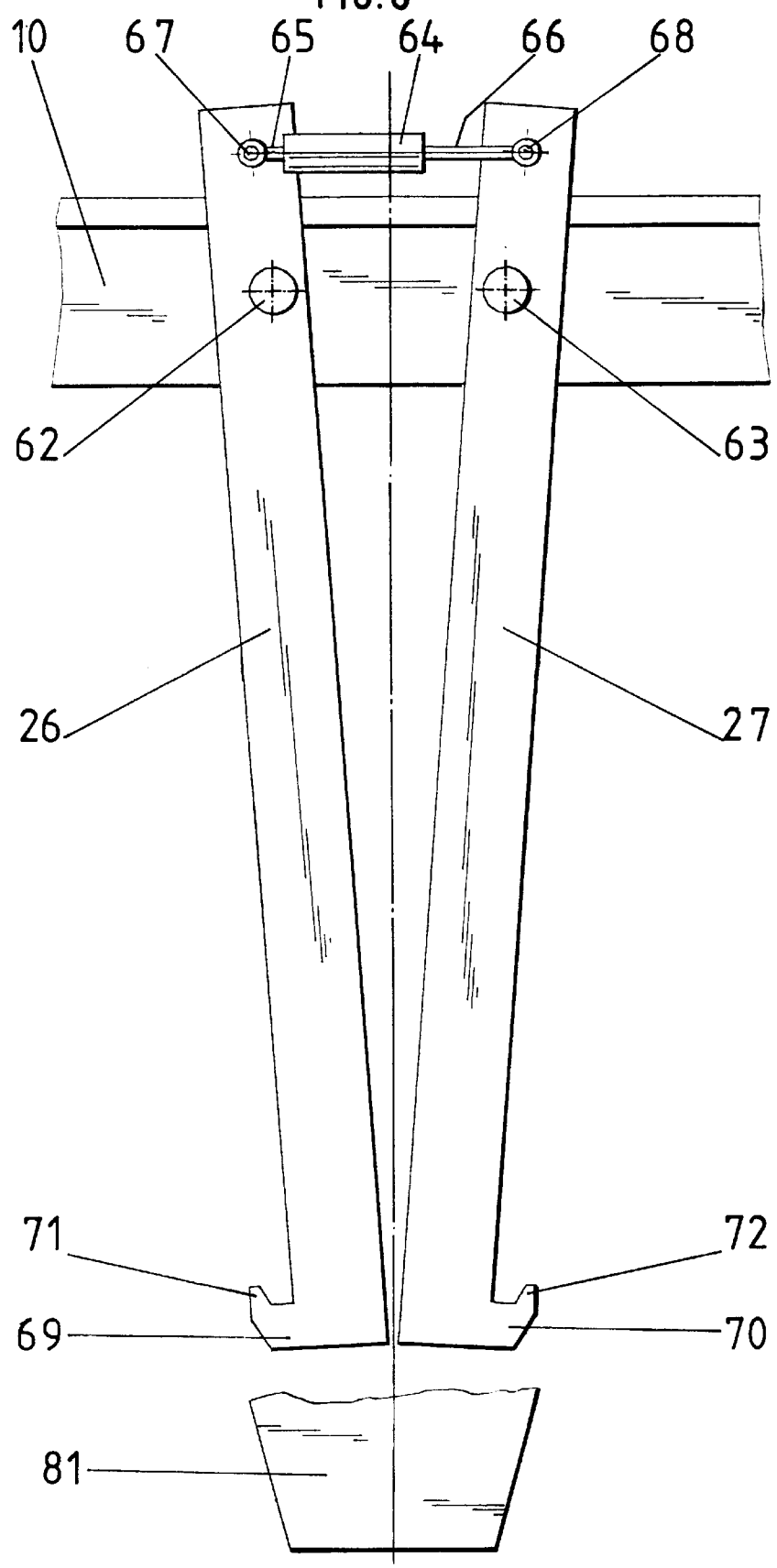
FIG. 8 shows the connection of the load arm and load receiving means of FIGS. 6 and 7 with the load-carrying beams of the lifting system.

After the load arms 26, 27 are oriented as shown in FIG. 7 and the lifting beam 10 is raised so that the load receiver 70, 71 and corresponding pawl 71, 72 engage respective protrusions, the selected yoke 3, 4 (associated with one type of long workpiece 5) can be lifted by actuation of the lifting beam 10. More specifically, the full gantry crane 6 can be moved vertically as shown in FIG. 2, so that the yoke containing workpieces can be removed from the stack and set down on another stack or placed at some other location, where further manipulation of the workpieces may occur.

If desired workpieces are not located in the uppermost position (top yoke) of the stack 1, 2, then the yoke located above the desired yoke must first be individually removed and temporarily set down on another stack so that the desired yoke can be accessed.

Figure 9:
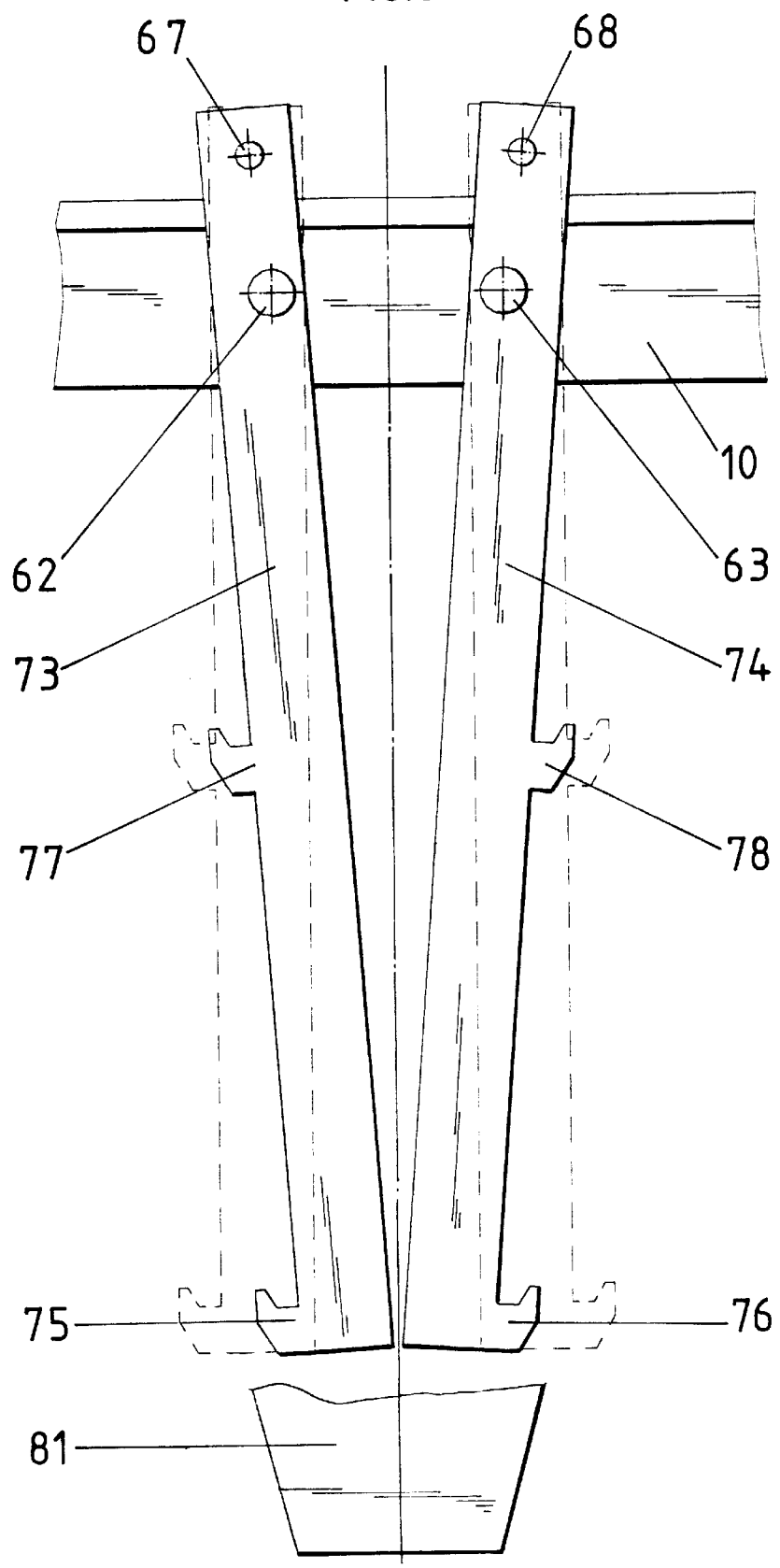
FIG. 9 shows an alternative embodiment of the load receiving means of FIG. 8.
Figure 10:
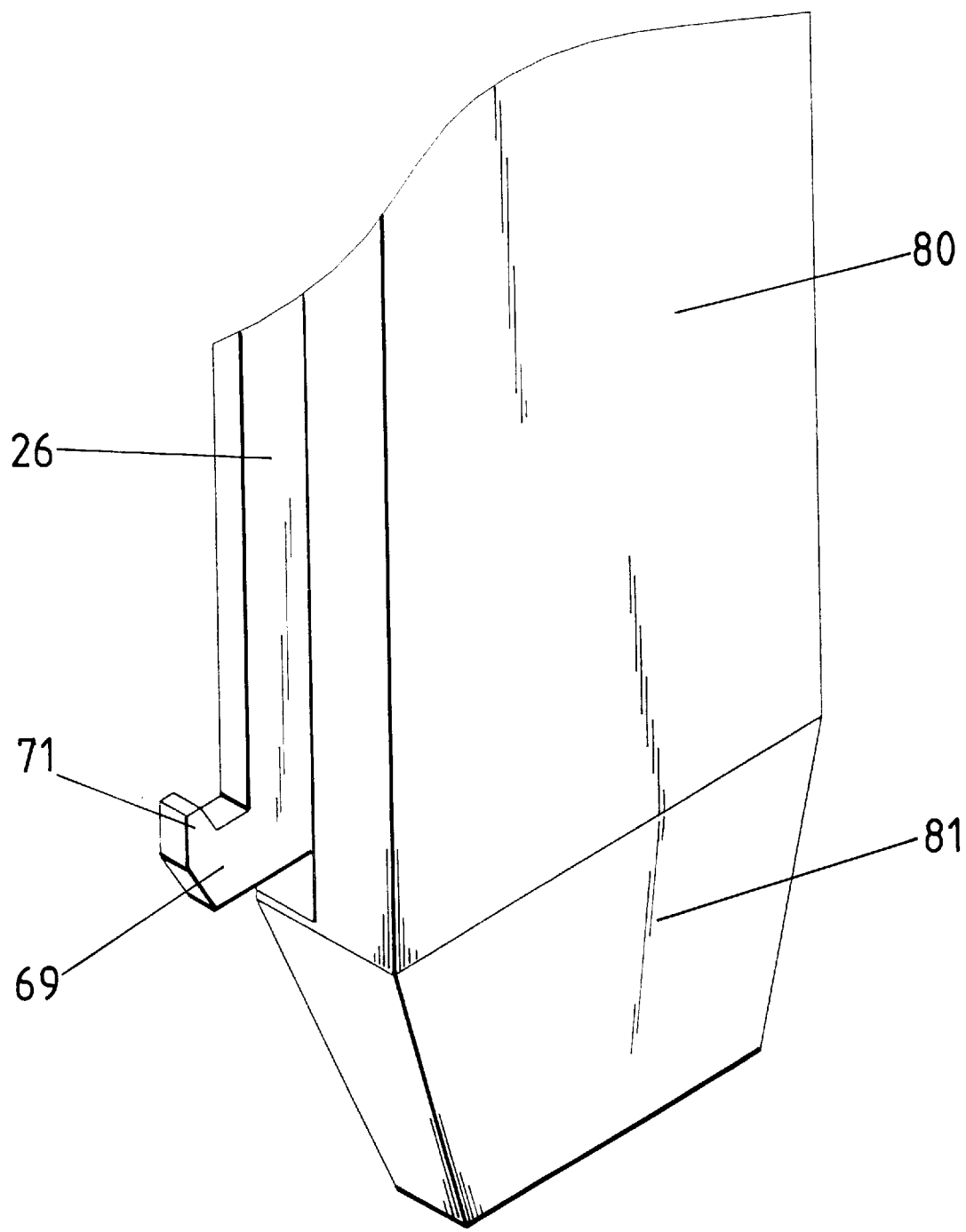
FIG. 10 shows enlarged detail of FIG. 3.

In order to achieve this object, in a preferred embodiment of the invention as shown in FIG. 8, the load arms 26, 27 have a free length above the load receivers 69, 70 (i.e., length between the load receivers and the lifting beam) that spans the height of at least two yokes stacked on one another. It may also be provided as shown in FIG. 9, that the vertical load arms 73, 74 are equipped not only with their lower load receivers 75, 76 but also with upper load receivers 77, 78 disposed at a distance above the lower load receivers. In this embodiment, the vertical spacing of the upper and lower load receivers 75, 77 and 76, 78 are preferably at least equivalent to the vertical spacing of the associated protrusions of two yokes stacked on one another. However, it may be preferable to choose a somewhat greater vertical spacing so that more than two yokes can be simultaneously maneuvered, and to include more than two pairs of load receivers on the load arms.

As a result of the just described feature shown in FIG. 9, it is possible, in one lifting motion of the lifting beam 10 to simultaneously access at least two distally located workpieces, positioned one above the other, and set them down elsewhere, thus enabling faster access to workpieces positioned at bottom positions of the stack.

The load arms 26, 27 (of FIG. 8) or 73, 74 (of FIG. 9) may naturally be made even longer, so that they can carry an even larger number of load receivers one on top of the other (as long as the associated protrusions and load receivers can support the weight a plurality of yokes).

In terms of the above description of the transposition and stacking of the yokes, it is also significant that the stacked yokes are centered on one another. The metal plates 46, 47 and the metal sheets 52, 53 described, which intrinsically provide a stable and sturdy structure, also serve to ensure that the yokes are stacked in a secure manner. This is accomplished by the engagement of metal plates and metal sheets shown in FIG. 3.

Referring again to FIG. 4, two identical yokes are shown one above the other. If the top yoke is placed on the lower yoke, it can be seen that in the course of this "setting-down" motion, if accurate mutual centering in the vertical direction is lacking, the metal sheets 52, 53 of the upper yoke will come into contact with the upper angled chamfered edges 48, 49, 50, 51 of the metal plates 46, 47 of the lower yoke. Since the metal sheets 52, 53 are obliquely positioned, this contact leads to a "threading-in" operation, which assures that the upper yoke will be positioned substantially centrally (both horizontally and vertically) on the lower yoke.

As already described in conjunction with the drawings, the upper ends of the metal plates 46, 47 have respective chamfers 48, 49, 50, 51 for aiding in the positioning of one yoke on another yoke. If two yokes are placed one on the other and if the yokes are not precisely aligned, then the vertical profile bars 34, 35 contact the chamfers 48, 49, and the vertical profile bars 36, 37 contact the chamfers 50, 51. The profile bars 34, 35, 36, 37 can then slide along the chamfers until, in terms of the view shown in FIGS. 6 and 7, an accurate central arrangement of yokes seated one above the other is attained.

In one embodiment of the invention, a guide profile 80, which is shown in FIGS. 3–10, is vertically oriented and substantially parallel to the load arms 26, 27 and 73, 74. On its lower end, the guide profile has a tapered portion 81, extending both in the longitudinal direction of the workpieces and crosswise. The tapered portion 81 serves, as the load arms descend, to center the passage of the load arms through the space between the protrusions 58, 59, 60, 61.

Figure 11:
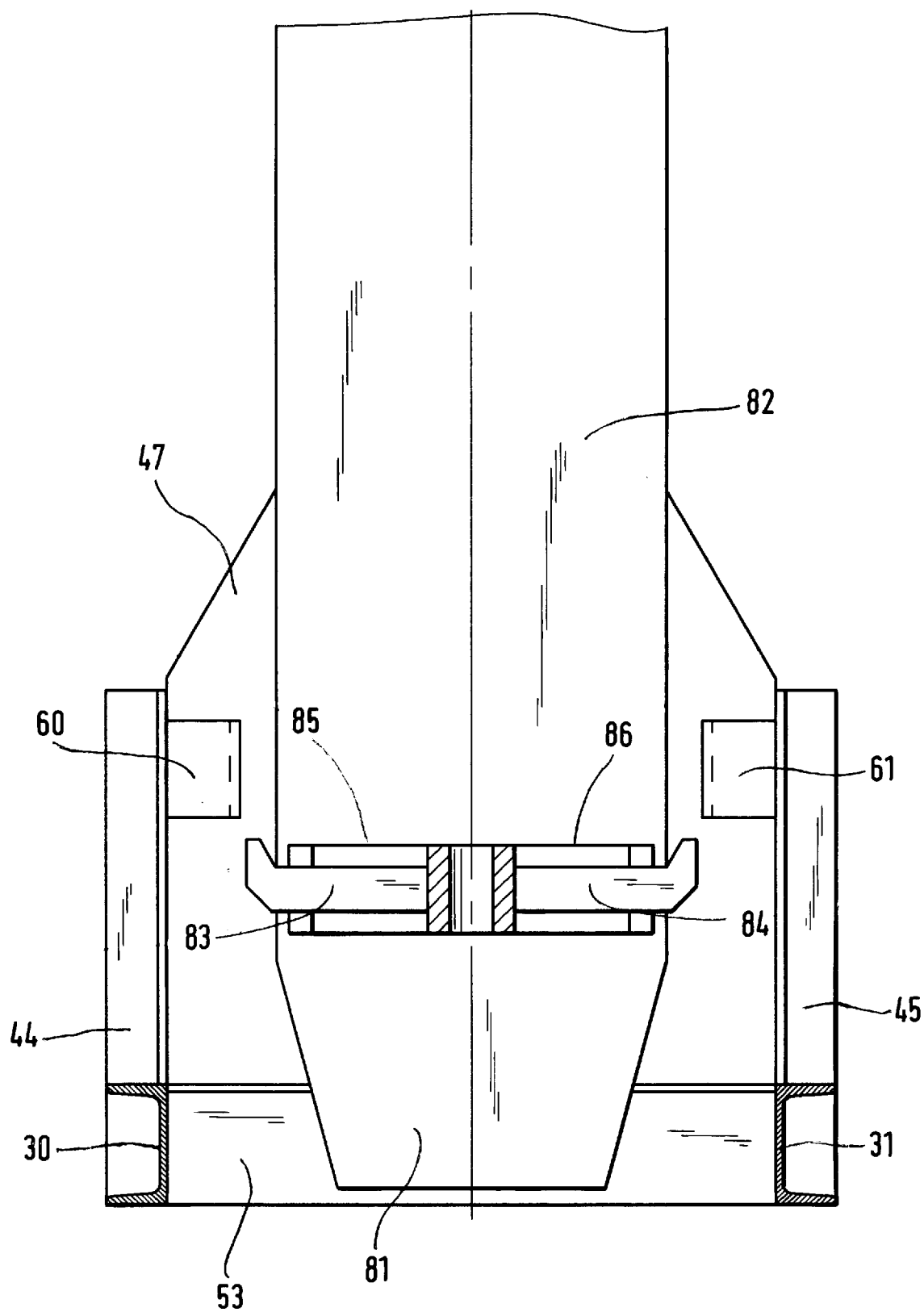
FIG. 11 shows an alternative embodiment of the load receiving means of FIG. 6.

The present invention, as can be seen particularly from FIGS. 6–9, incorporates two vertical load arms 26, 27 and 73, 74 with respective load receivers 69, 70 and 75, 76, 77, 78 in cooperation with protrusions 58, 59, 60, 61. However, it is also foreseen as shown in FIG. 11, that the load arms 26, 27 and 73, 74 may be replaced by a single load arm 82, coupled to the lifting beam 10. On its lower end, for instance, the load arm has horizontal load receivers 83, 84 that horizontally extend and retract. The actuation of load receivers 83, 84 may be accomplished hydraulically, via the cylinder and piston units 85, 86, which are arranged on the end of the single load arm 82 and whose piston rods form the adjustable load receivers 83, 84. Similar to that described previously, longer load arms may be utilized, or adjustable load receivers may be disposed with a plurality of load receivers, so that in this way a plurality of yokes stacked one on the other can be grasped.

Figure 12:
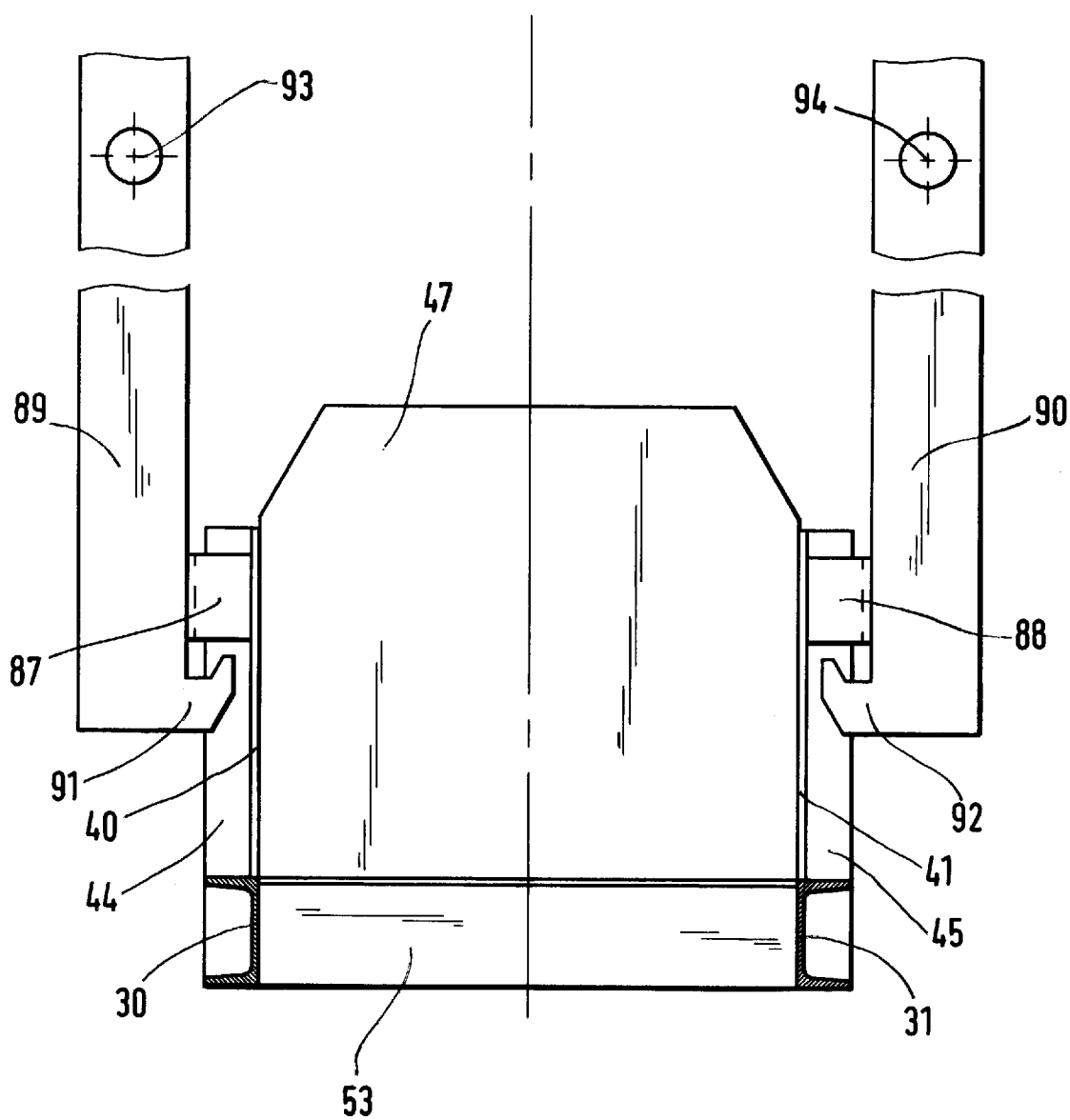
FIG. 12 shows an alternative embodiment of the load receiving means of FIG. 6.

In the above embodiment as shown in FIG. 5, the protrusions 58, 59, 60, 61 are located proximate the corner angles between the metal plates 46, 47 and the vertical profile bars 34, 35, 36, 37. The protrusions 87, 88 may be disposed so as to be coupled to interior surfaces of the L-shaped profile bars 34, 35, 36, 37, as shown in FIG. 12. In this embodiment, load arms 89, 90 which correspond to load arms 26, 27 are supported pivotally about shafts 93, 94 on the lifting beam 10 need merely be moved apart and rotated 180° with respect to a vertical axis. As a result, the load receivers 91, 92 can engage the protrusions 87, 88 from outside and below the yokes as shown in FIG. 12.

Figure 13:
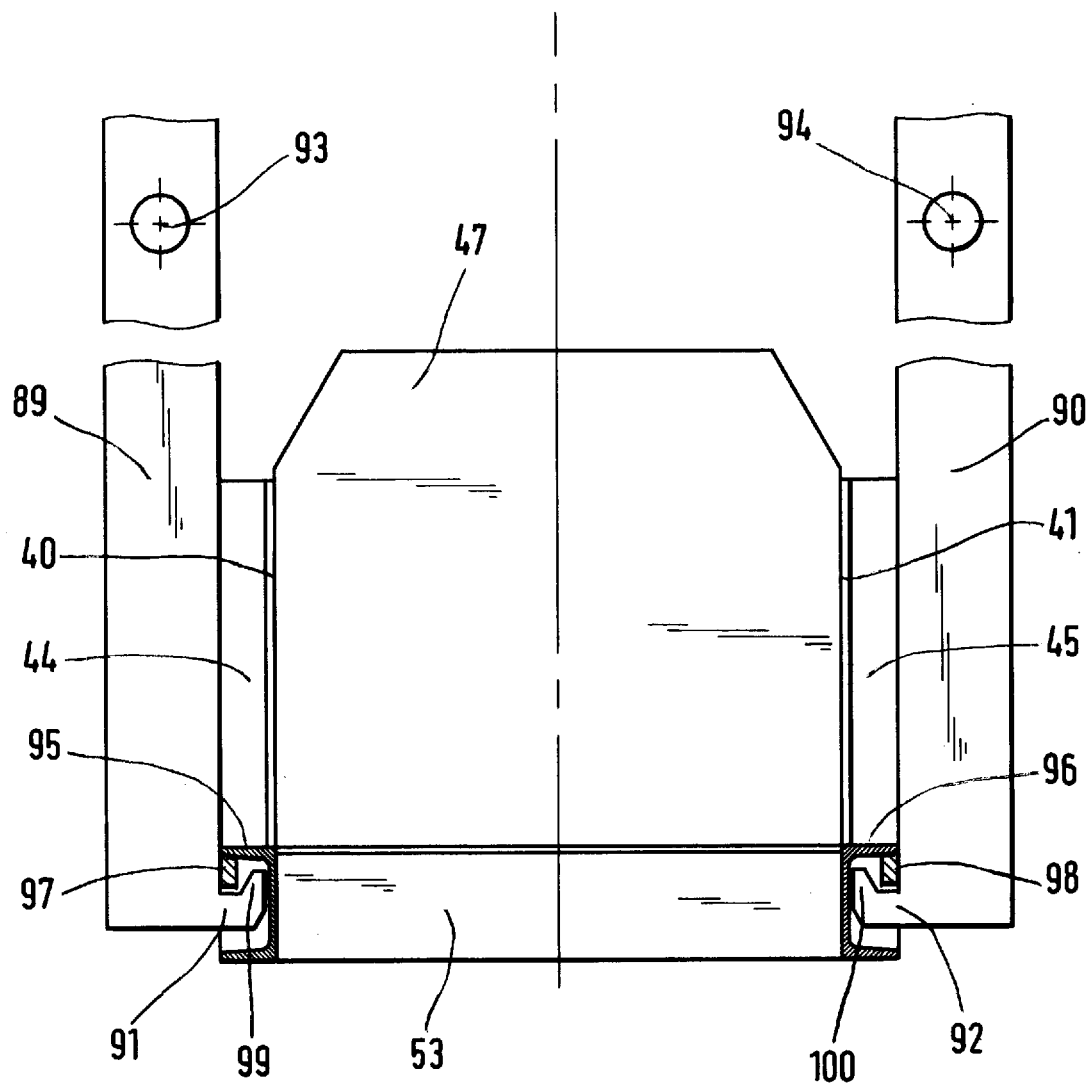
FIG. 13 shows an alternative embodiment of the load receiving means of FIG. 6.

In an alternative embodiment of the invention, it is also possible to eliminate the protrusions 87, 88 if the U-shaped horizontal profiles 30, 31 terminate at the free ends of the legs 38, 39, 40, 41 of L-shaped vertical profiles 34, 35, 36, 37 respectively. As can be seen from FIG. 13, the load receivers 91, 92 are designed to engage the underside of the top legs 95, 96 of the U-shaped horizontal profiles 30, 31. In order to provide a secure engagement of load receivers 90, 91 and top legs 95, 96, abutments 97, 98 are provided on an interior surface of the ends of the legs 95, 96. In addition, pawls 99, 100 are included on receivers 91, 92 which engage abutments 97, 98 in hooklike fashion.

Figure 14:
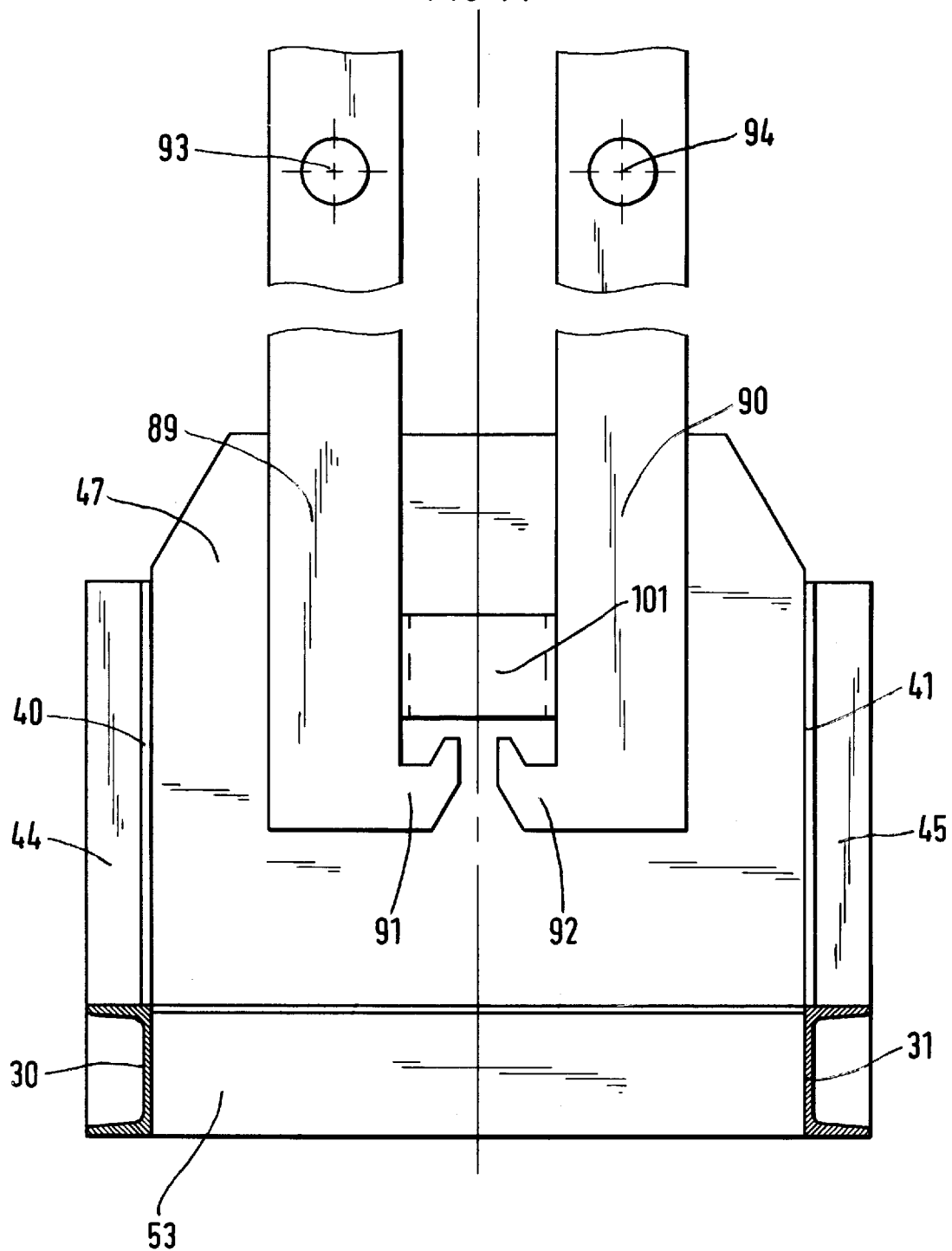
FIG. 14 shows an alternative embodiment of the load receiving means of FIG. 6.

FIG. 14 shows a further embodiment of the invention in which the protrusions 58, 59 and 60, 61, are each replaced by a somewhat wider single protrusion 101, which is located substantially in the middle of the metal plates 46 and 47. In this embodiment, protrusion 101 may be engaged from below and from both sides by load arms 89, 90 rotated by 180°.

Figure 15:
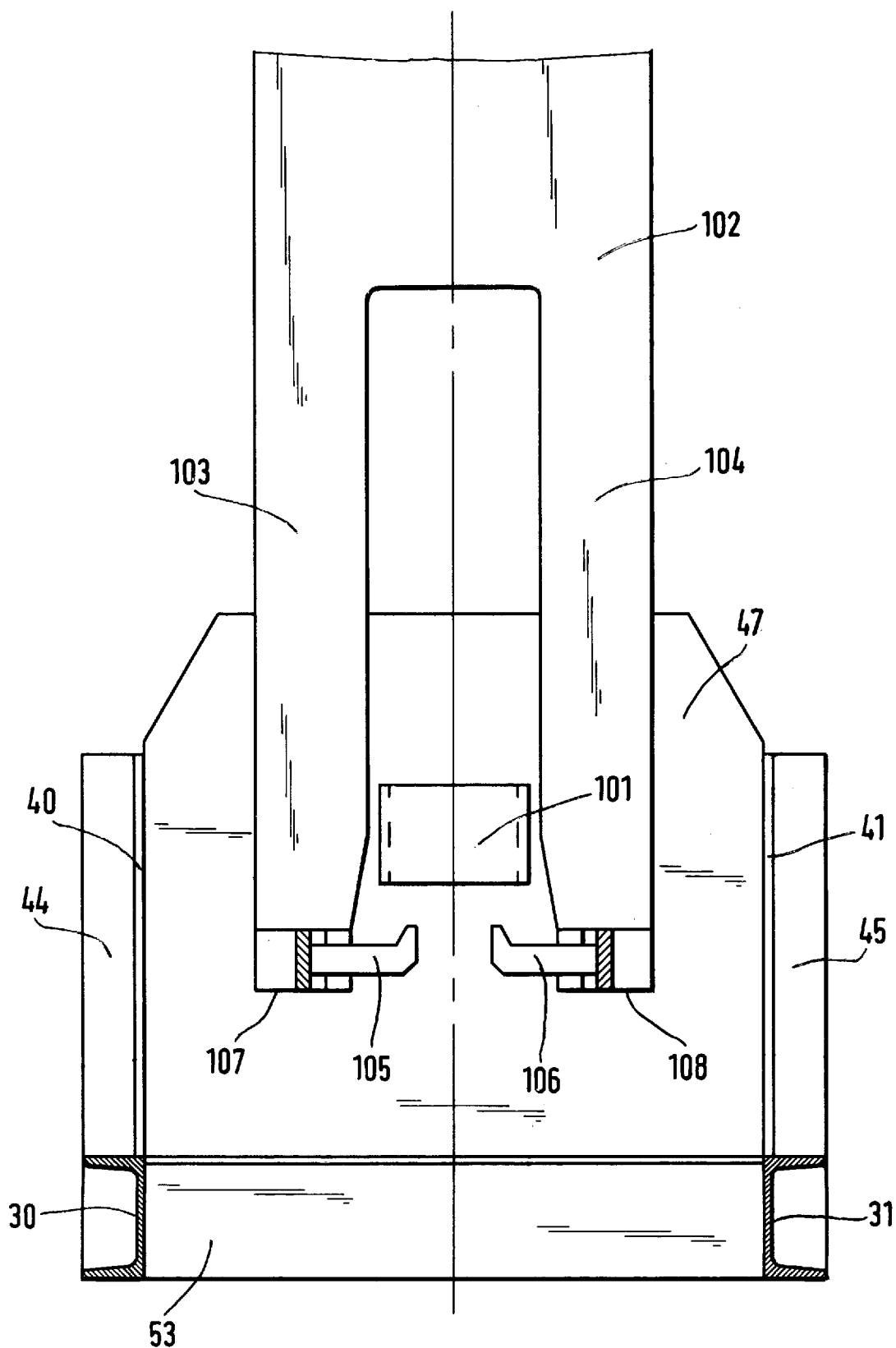
FIG. 15 shows an alternative embodiment of the load receiving means of FIG. 6.

In still another embodiment as shown in FIG. 15, the two load arms 89, 90 are replaced by a single load arm 102. The single load arm 102 is forked on its lower ends 103, 104. The lower ends 103, 104 have load receivers 105, 106 attached thereto which can be horizontally extended and retracted in the manner already described and shown in FIG. 11. The load receivers 105, 106 may be extended and retracted by movement of piston units 107, 108.

Figure 16:
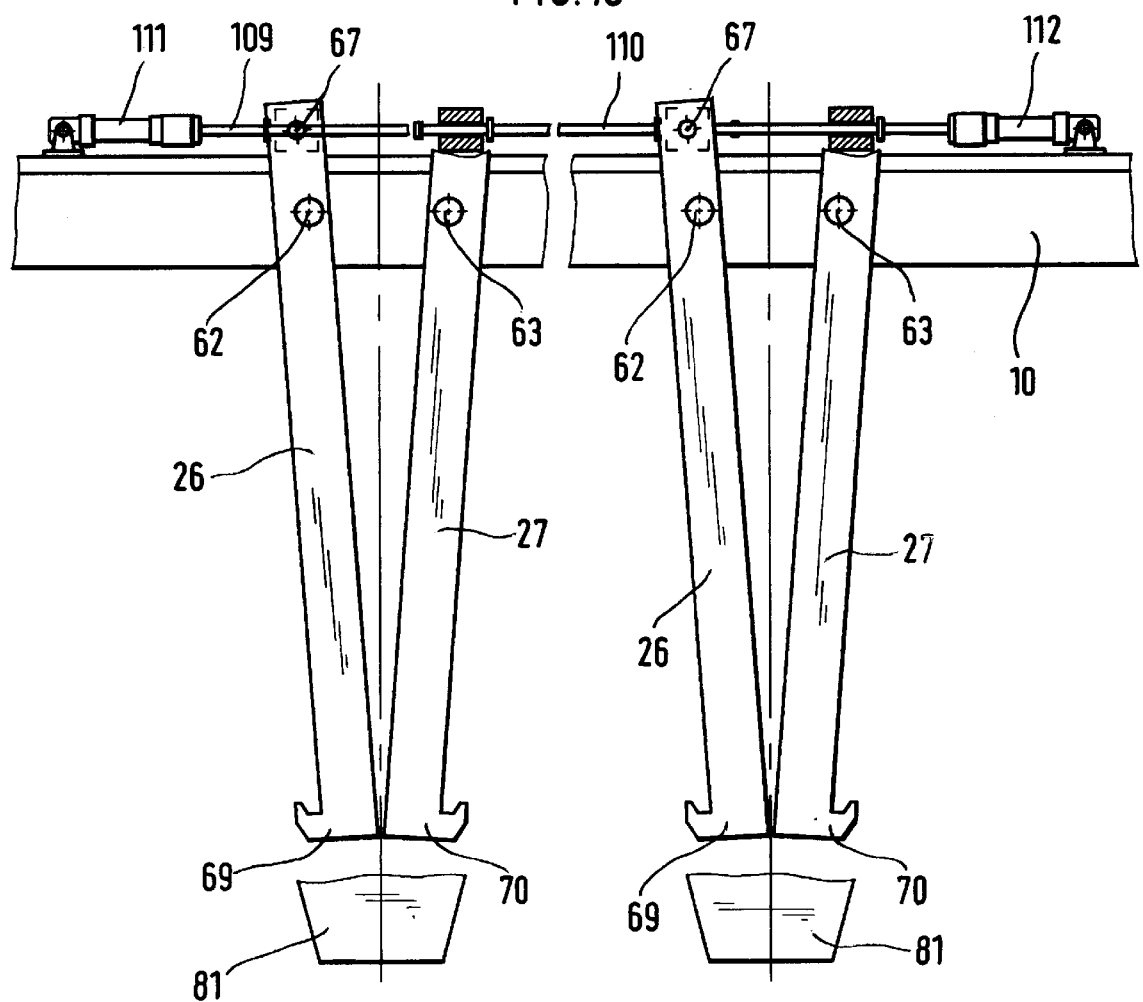
FIG. 16 shows an alternative embodiment of the present invention of FIG. 8 in side view.
Figure 17:
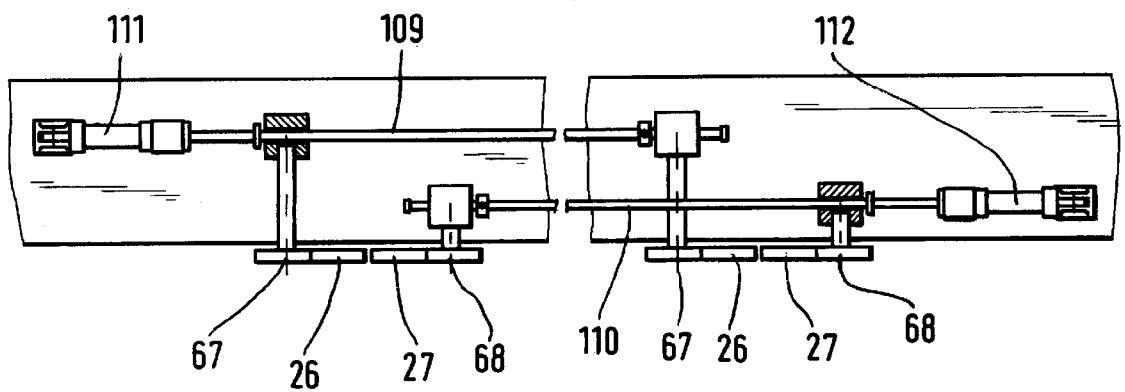
FIG. 17 shows an alternative embodiment of the present invention of FIG. 8 in plan view.

Referring to FIGS. 16 and 17, instead of the adjusting device 64 of FIG. 8, piston rods 109, 110 are provided which extend horizontally above the lifting beam 10. Piston rod 110 is pivotally connected to the right-hand load arms 27 and piston rod 109 is pivotally connected to the left-hand load arms 26. As a result, the rows of right and left load arms are jointly and simultaneously pivotally adjustable by the piston rods, with the aid of corresponding drive means such as hydraulic piston and cylinder units 111, 112.

In one embodiment of the invention, the storage device employs a full-gantry crane 6. It is understood that instead of such a full-gantry crane, it is also possible to use a lifting system that is movable along the ceiling of a hangar-like space.

The storage setup apparatus of the present invention is preferably adjusted to a uniform width of the yokes crosswise to the longitudinal direction of the workpieces. However, it foreseen that yokes of different widths may be utilized as long as the load arms associated with one yoke are correspondingly mutually adjustable crosswise to the longitudinal direction of the load-carrying beam.

In one embodiment of the invention, this can be accomplished by having the load arms, arranged on one longitudinal side of the load-carrying beam, seated with corresponding actuating means on one or more carriages that can be displaced on the load-carrying beam crosswise to its longitudinal direction and can be fixed in whatever displacement position is desired.

Figure 18:
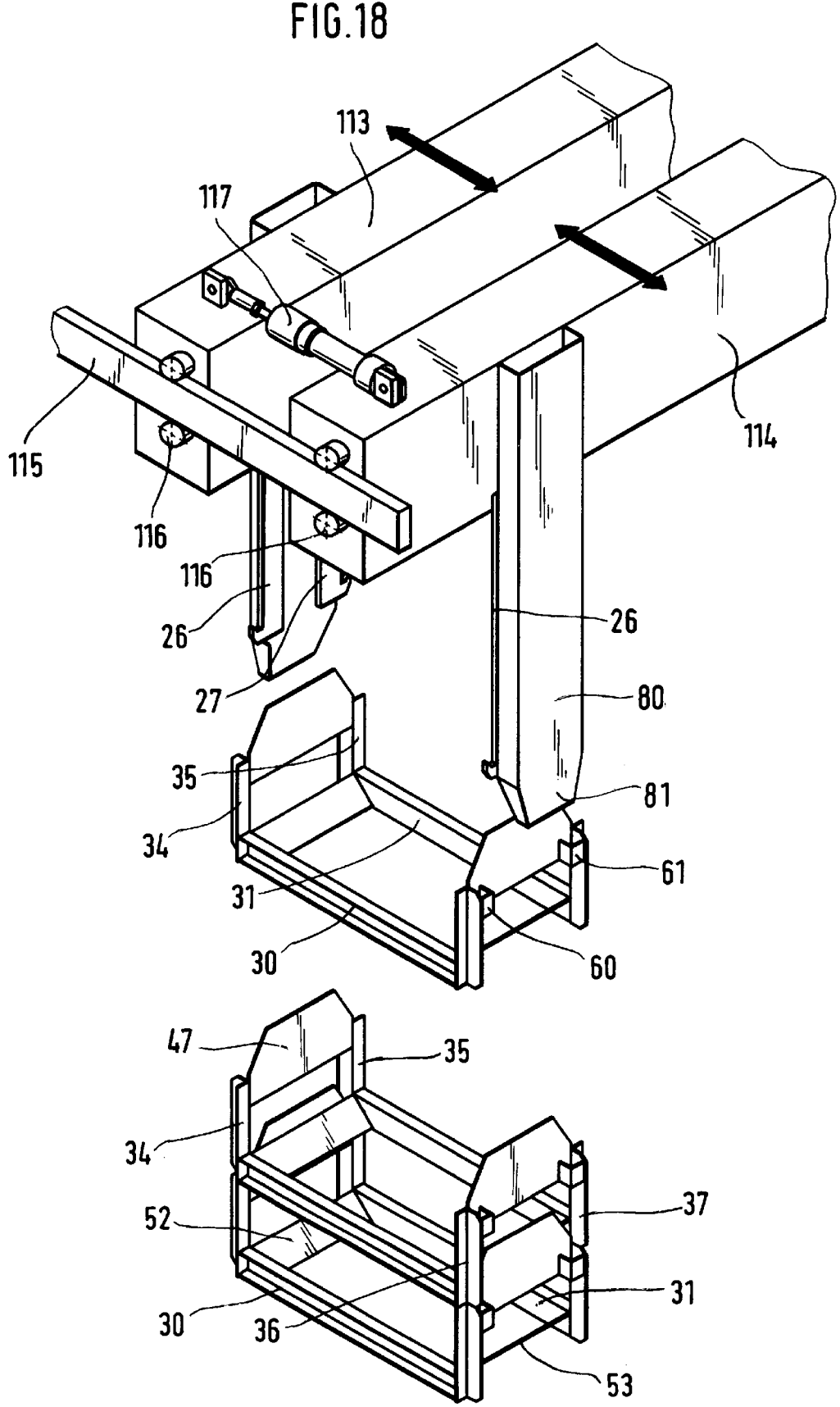
FIG. 18 shows an alternative embodiment of the present invention of FIG. 3.

A structure for this is shown in FIG. 18. It can be seen from FIG. 18 that the load-carrying beam 10 of FIG. 3 may be divided in the longitudinal direction (lengthwise) creating load-carrying beam parts 113, 114. The beam parts are adjustable horizontally relative to one another by horizontal rail 115 and rollers 116 located on their face (near) end. In addition, the relative spacing of the load-carrying beam parts 113, 114 can be adjusted to the particular size of the respective yokes 3, 4, by means of cylinder and piston unit 117. In this embodiment the rails 115 are then movable vertically on the vertical supports 7, 8 (FIGS. 1 and 2) in a suitable known manner.

In all the structural forms described thus far, the load receivers 69, 70, 71, 72, 75, 76, 77, 78, 83, 84, 91, 92, as well as 105 and 106, are adjustable parallel to the longitudinal direction of the workpieces 5 (i.e., parallel to the ride parts 32, 33 of the yokes). However, it is equally possible for the load receivers to be made adjustable crosswise to the direction of the workpieces 5. Examples of this are shown in FIGS. 19 and 20 with respect to yoke 3, 4, of the kind that has been described in conjunction with FIG. 12 referring back to FIGS. 4–6.

Figure 19:
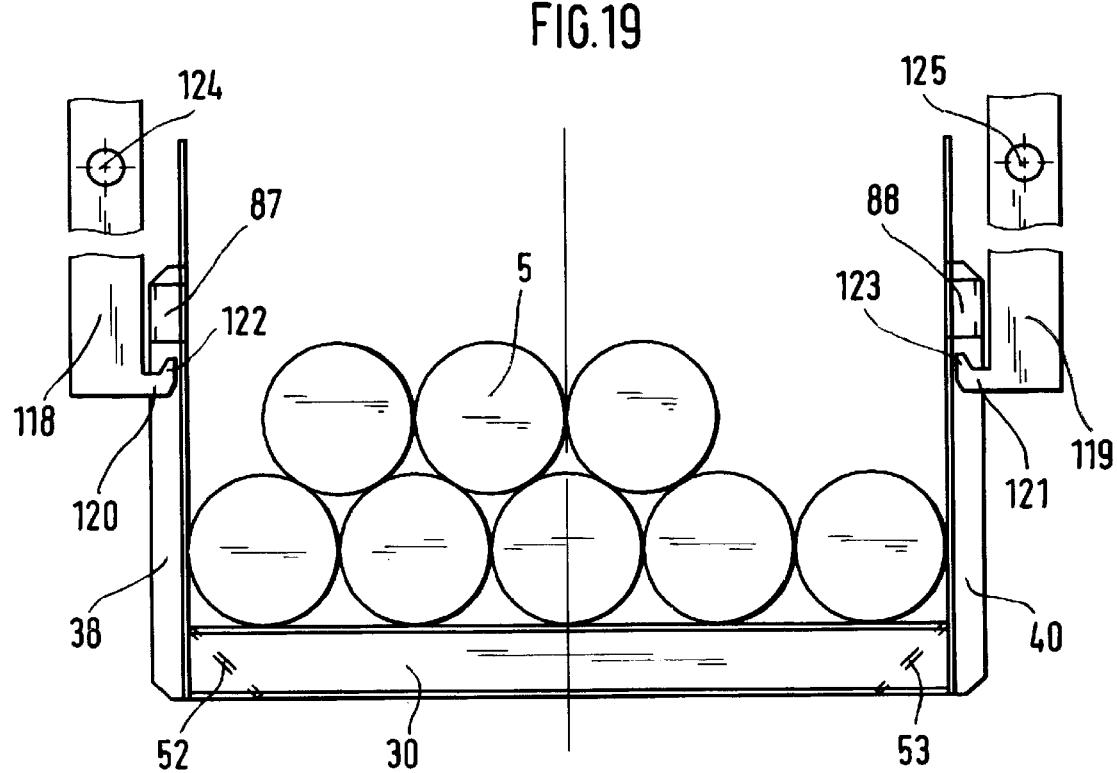
FIG. 19 shows an alternative embodiment of the load receiving means of FIG. 6.

FIG. 19 shows load arms 118 and 119, which are correspondingly arranged in pairs on both sides of the yoke, beginning at the load-carrying beam 10 (not shown) or load-carrying beam parts 113, 114 (not shown). on their lower end, the load arms 118, 119 have load receivers 120, 121, extending crosswise to the longitudinal direction of the workpieces 5. The load arms may be moved underneath the protrusions 87, 88 and may engage the hollow profile thereof with terminal pawls 122, 123. Correspondingly, the load arms 118, 119 are pivotable on the load-carrying beam 10 or load-carrying beam parts 113, 114 about a shaft 124, 125 parallel to the workpieces. The pivoting accomplished with the aid of the actuating means of the type described is known and therefore is not further illustrated or described.

Figure 20:
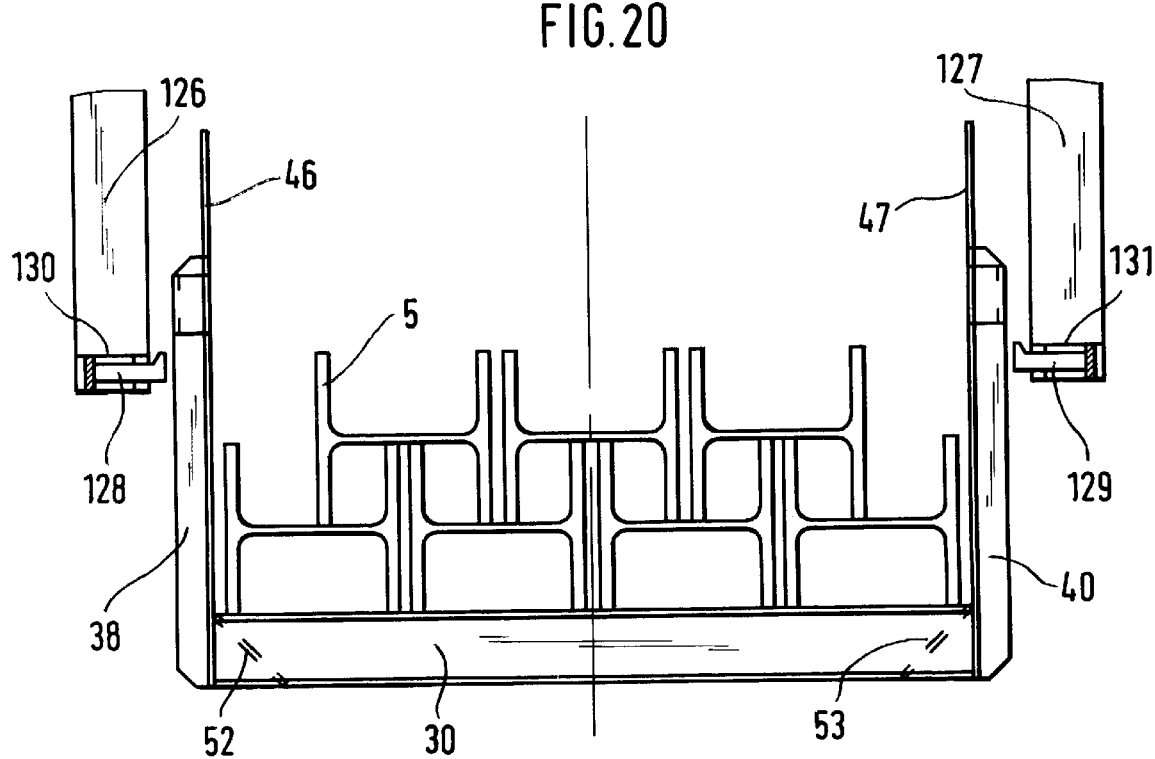
FIG. 20 shows an alternative embodiment of the load receiving means of FIG. 6.

FIG. 20 substantially differs from FIG. 19 in that the load arms 126, 127 are fixedly mounted to the load-carrying beam 10 (not shown) or load-carrying beam parts 113, 114 (not shown). In contrast, the horizontal motion of the load receivers 128, 129 crosswise to the longitudinal extent of the workpieces 5 is accomplished by piston rods of cylinder and piston units 130, 131, which are mounted on the lower end of the load arms 126, 127.

For the structural form of the embodiments shown in FIGS. 19 and 20, load arms 118, 119 and 126, 127 can be replaced by single load arms. This may be achieved if the yokes are provided with single protrusions 101 as shown in FIG. 14, or if a structural form corresponding to that of FIG. 11 is chosen.

In all other respects, the descriptions of FIGS. 1–18 logically apply to the structural forms of FIGS. 19 and 20 as well.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

We claim:

1. A setup apparatus for storing and transporting long workpieces, comprising:

a plurality of substantially U-shaped yokes in which the workpieces are received on a substantially horizontal bottom part and between two substantially vertical side parts connected to the substantially horizontal bottom part, each of the plurality of yokes being stackable on one another and including means for engagement of load receivers of a lifting system for lifting and setting down the yokes; wherein the means for the engagement of the load receivers includes at least one protrusion on an outside portion of each side part (32, 33);

and wherein the lifting system, associated with each side part has at least two load receivers and at least one load arm extending substantially vertically downward for engaging the load receivers;

and wherein the load receivers are adjustable between a horizontal position adjacent the protrusions and a position below the protrusions.

2. The setup apparatus as defined by claim 1, wherein the load receivers are adjustable transversely along a longitudinal direction of the horizontal bottom part.

3. The setup apparatus as defined by claim 1, wherein the load receivers are adjustable parallel to the longitudinal direction of the horizontal bottom part.

4. The setup apparatus as defined by claim 1 wherein each said side part includes at least two protrusions proximally positioned in a horizontal direction.

5. The setup apparatus as defined by claim 4, wherein each of the at least two protrusions are positioned at substantially the same distance from a respective horizontal bottom part.

6. The setup apparatus as defined by claim 1 wherein the side parts include a plurality of substantially vertical profile bars, and wherein the bottom part includes at least two horizontal profile bars extending substantially horizontally, and orthogonal to the vertical profile bars, and wherein the ends of each of the horizontal profile bars are coupled to the lower ends of a respective pair of vertical profile bars.

7. The setup apparatus as defined by claim 6 wherein the vertical profile bars have an L-shaped cross section including first legs and second legs, the vertical profile bar being arranged such that each of the first legs substantially point away from the yoke and are parallel to the horizontal profile bars, and the second legs are substantially orthogonal to the first legs and are perpendicular to the horizontal profile bars.

8. The setup apparatus as defined by claim 7, wherein the vertical profile bars are operatively coupled in an upper half region of their longitudinal extent by an interposed plate oriented in a substantially vertical plane.

9. The setup apparatus as defined by claim 8 wherein the plate includes a first surface facing substantially toward an inner portion of the yoke, the first surface being oriented in substantially the same plane as the first legs of the vertical profile bars.

10. The setup apparatus as defined by claim 8 wherein the plates have a thickness which is less than a thickness of one of the first and second legs of the vertical profile bars.

11. The setup apparatus as defined by claim 8 wherein the plates have a portion which extends beyond upper ends of the associated profile bars.

12. The setup apparatus as defined by claim 8 wherein the plates include two upper side edges which protrude beyond the upper ends of the profile bars, the two upper side edges are chamfered and extend substantially toward one another and toward an upper edge of the plates.

13. The setup apparatus as defined by claim 6 further comprising:
    a sheet located between respective ends of the horizontal profile bars and within a vertical cross-sectional region occupied by the workpieces, an upper edge and lower edge of the sheet being located within a range defined by the vertical extent of the cross section of the profile bars.

14. The setup apparatus as defined by claim 13 wherein the upper edges of the sheet are spaced a greater relative distance than the spacing between the lower edges of the sheets.

15. The setup apparatus as defined by claim 6 wherein if each side part includes first and second protrusions, the horizontal profile bar includes ends which extend to an outer surface of the side parts, the horizontal profile bars having a U-shaped cross-section with inner and outer portions and upper and lower legs, the upper leg of each profile bar forming the first and second protrusions.

16. The setup apparatus as defined by claim 6 wherein the horizontal profile bars have a U-shaped cross section having an opening.

17. The setup apparatus as defined by claim 16 wherein the horizontal profile bars are arranged such that the openings of the U-shaped cross section faces in a direction external to the yoke.

18. The setup apparatus as defined by claim 1 wherein if the side parts include first and second protrusions, the first and second protrusions are positioned proximate interposed plates and coupled to both a vertical profile bar and the plates.

19. The setup apparatus as defined by claim 1 wherein if the side parts include one protrusion, the protrusion is positioned so as to be substantially horizontally and centrally located with respect to interposed plates.

20. The setup apparatus as defined by claim 1 wherein if the side parts include first and second protrusions, the protrusions are positioned so as to face in substantially opposite directions.

21. The setup apparatus as defined by claim 20 wherein the protrusions have a bore extending substantially therethrough to provide a substantially hollow cross section that is open in one direction.

22. The setup apparatus as defined by claim 20 wherein the load receivers include an upward-protruding pawl for engagement with the protrusions.

23. The setup apparatus as defined by claim 20 wherein the protrusions are positioned in an upper portion of the vertical profile bars.

24. The setup apparatus as defined by claim 1 wherein the lifting system has a vertically movable lifting beam substantially extending over a region where the workpieces are stored, and wherein the load arms are secured to and extend from the lifting beam in a vertical plane substantially corresponding to a plane associated with first and second protrusions of a corresponding side part.

25. The setup apparatus as defined by claim 1 wherein the load arm includes on a lower end, at least two load receivers adjustable in a horizontal direction between an extended and an unextended position.

26. The setup apparatus as defined by claim 1 wherein two load arms are substantially oriented in a common plane parallel to a corresponding side part, and wherein the load arms are pivotally coupled about a horizontal shaft to a lifting beam, the load arms being coupled to pivot actuation means about the horizontal shaft, and wherein the load arms include the load receiver protruding horizontally in the direction of an associated protrusion.

27. The setup apparatus as defined by claim 1 wherein each side part includes two load arms oriented on substantially opposite sides of a lifting beam, and wherein the load arms are pivotally coupled to the lifting beam about a horizontal shaft which extends transversely along the longitudinal direction of the workpieces, and wherein the load arms are coupled to pivot actuation means about the horizontal shaft, and wherein the load arms include a load receiver protruding horizontally in the direction of an associated protrusion.

28. The setup apparatus as defined by claim 27 wherein, the load arms have a length above the load receivers that is at least equivalent to a height of at least two yokes stacked on one another.

29. The setup apparatus as defined by claim 28 wherein the load arms have a plurality of load receivers for engagement of the protrusions of yokes stacked on one another.

30. The setup apparatus as defined by claim 29 wherein the load receivers of a respective load arm are spaced apart such that the distance between corresponding load receivers is at least slightly greater than the spacing between the protrusions of yokes stacked on one another.

31. The setup apparatus as defined by claim 1 wherein the lifting system includes a full-gantry crane having vertical supports, and at least one longitudinal girder coupling upper ends of the vertical supports to one another, the longitudinal girder extending substantially parallel to workpieces, a load-carrying beam being vertically movable and guided along the vertical supports.

32. The setup apparatus as defined by claim 31 wherein the vertical supports of the lifting system are transversely movable to substantially the longitudinal extent of the workpieces.

33. The setup apparatus as defined by claim 32 wherein the load arms have a length, which is transverse to the longitudinal direction of the workpieces, that is adjustable to enable engagement with yokes having differing widths.

34. The setup apparatus as defined by claim 33 wherein, a load-carrying beam includes two load-carrying beam parts that are substantially parallel to the workpieces and are substantially adjacent along their length, the two beam parts being spaced-apart a distance, and wherein each load-carrying beam part substantially supports the load arms, and wherein the distance between the two load-carrying beam parts is adjustable.

* * * * *